(12) United States Patent
Peng et al.

(10) Patent No.: US 12,204,107 B2
(45) Date of Patent: Jan. 21, 2025

(54) PATTERNED LIGHT ILLUMINATOR FOR A DISPLAY PANEL

(71) Applicant: Meta Platforms Technologies, LLC, Menlo Park, CA (US)

(72) Inventors: Fenglin Peng, Redmond, WA (US); Jacques Gollier, Sammamish, WA (US); Liangyu Qiu, Rochester, NY (US); Xingzhou Tu, Redmond, CA (US); Ying Geng, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 532 days.

(21) Appl. No.: 17/553,635

(22) Filed: Dec. 16, 2021

(65) Prior Publication Data

US 2023/0194866 A1    Jun. 22, 2023

(51) Int. Cl.
*G02B 27/01* (2006.01)
*G02B 26/08* (2006.01)
*G02B 27/09* (2006.01)

(52) U.S. Cl.
CPC ..... *G02B 27/0172* (2013.01); *G02B 26/0816* (2013.01); *G02B 27/0961* (2013.01);
(Continued)

(58) Field of Classification Search
CPC .. G02B 27/01; G02B 27/017; G02B 27/0101; G02B 27/0172; G02B 27/0176;
(Continued)

(56) References Cited

U.S. PATENT DOCUMENTS

| 6,124,974 A | 9/2000 | Burger |
| 8,767,216 B2 * | 7/2014 | Yang ........................ G02B 5/32 |
| | | 356/450 |

(Continued)

FOREIGN PATENT DOCUMENTS

| CN | 113075793 A | 7/2021 |
| JP | 2019082700 A | 5/2019 |

(Continued)

OTHER PUBLICATIONS

International Search Report and Written Opinion for International Application No. PCT/US2022/052481, mailed Apr. 11, 2023, 11 pages.

(Continued)

*Primary Examiner* — Sultan Chowdhury
(74) *Attorney, Agent, or Firm* — Greenberg Traurig, LLP

(57) ABSTRACT

An illuminator for a display panel includes a slab of transparent material for propagating illuminating light between outer surfaces of the slab, an out-coupling grating supported by the slab for out-coupling portions of the illuminating light along one of the outer surfaces of the slab, and an amplitude and/or phase mask for forming an array of light spots from the out-coupled illuminating light portions downstream of the focusing element for illuminating pixels of the display panel. The array of light spots may be repeated at a distance from the mask due to Talbot effect. A beam redirecting element such as a tiltable reflector and/or a steering surface may be provided to shift the lateral location of the illuminating light spots.

20 Claims, 16 Drawing Sheets

(52) U.S. Cl.
CPC .................. *G02B 2027/0112* (2013.01); *G02B 2027/0178* (2013.01)

(58) Field of Classification Search
CPC ............ G02B 27/0961; G02B 27/0081; G02B 2027/0112; G02B 2027/0174; G02B 2027/0178
See application file for complete search history.

(56) References Cited

U.S. PATENT DOCUMENTS

| | | | |
|---|---|---|---|
| 9,057,824 | B2 | 6/2015 | Gollier et al. |
| 10,345,506 | B1 | 7/2019 | Lyu |
| 10,935,730 | B1* | 3/2021 | Lou .................... G02B 27/0172 |
| 2016/0011353 | A1* | 1/2016 | Escuti ...................... G02B 5/32 |
| | | | 359/15 |
| 2017/0123218 | A1* | 5/2017 | Stigwall ............. G01B 11/2518 |
| 2018/0164645 | A1* | 6/2018 | Oh ..................... G02B 27/0172 |
| 2018/0196263 | A1 | 7/2018 | Vallius et al. |
| 2018/0227576 | A1* | 8/2018 | Fattal ................. G02B 27/4205 |
| 2021/0199970 | A1* | 7/2021 | Huang ............... G02B 27/0172 |

FOREIGN PATENT DOCUMENTS

| | | |
|---|---|---|
| KR | 20180050453 A | 5/2018 |
| TW | 201224623 A | 6/2012 |

OTHER PUBLICATIONS

International Preliminary Report on Patentability for International Application No. PCT/US2022/052481, mailed Jun. 27, 2024, 9 pages.

* cited by examiner

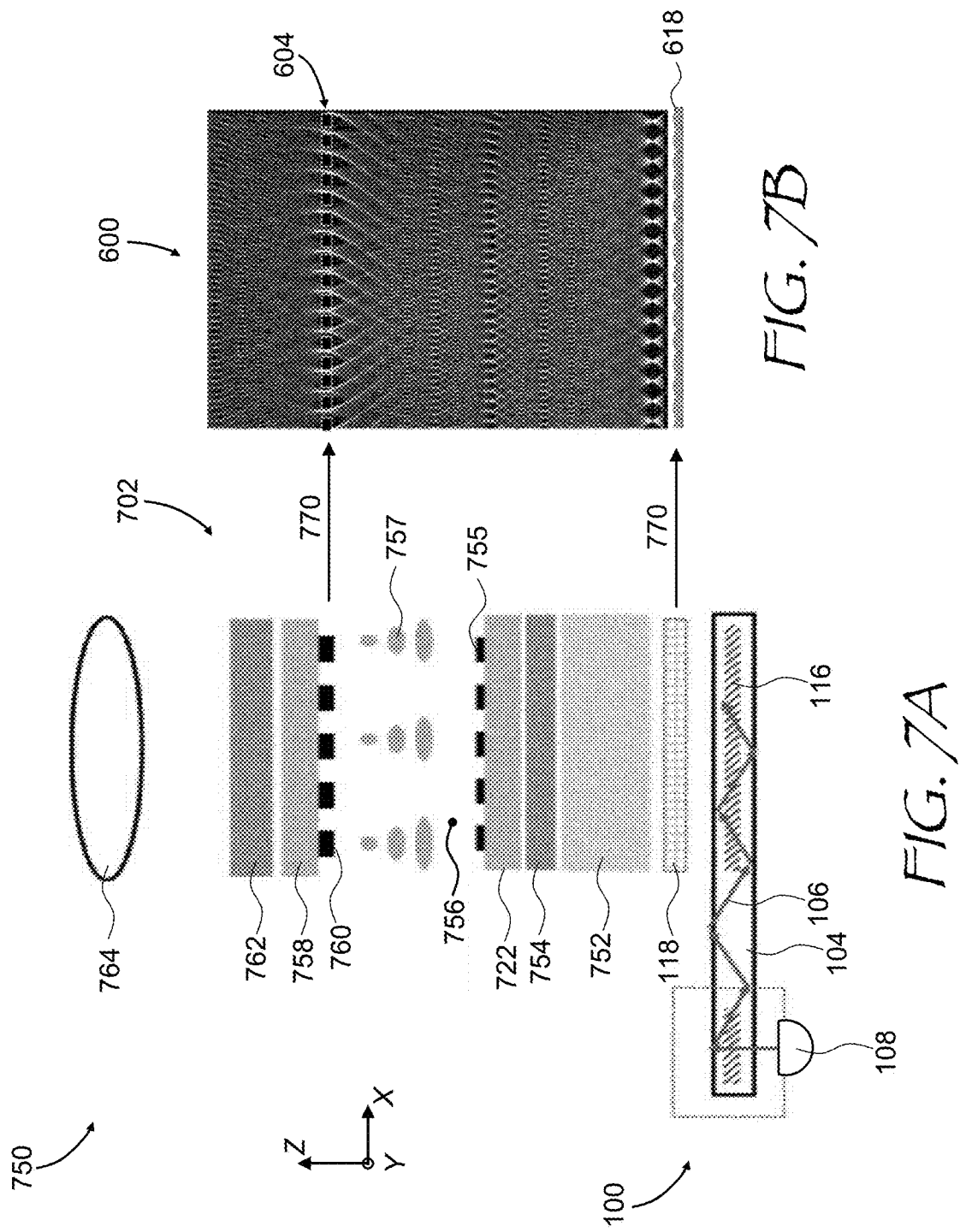

PATTERNED LIGHT ILLUMINATOR FOR A DISPLAY PANEL

TECHNICAL FIELD

The present disclosure relates to illuminators, visual display devices, and related components, modules, and methods.

BACKGROUND

Visual displays provide information to viewer(s) including still images, video, data, etc. Visual displays have applications in diverse fields including entertainment, education, engineering, science, professional training, advertising, to name just a few examples. Some visual displays such as TV sets display images to several users, and some visual display systems such s near-eye displays (NEDs) are intended for individual users.

An artificial reality system generally includes an NED (e.g., a headset or a pair of glasses) configured to present content to a user. The near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed with the surrounding environment by seeing through a "combiner" component. The combiner of a wearable display is typically transparent to external light but includes some light routing optic to direct the display light into the user's field of view.

Because a display of HMD or NED is usually worn on the head of a user, a large, bulky, unbalanced, and/or heavy display device with a heavy battery would be cumbersome and uncomfortable for the user to wear. Consequently, head-mounted display devices can benefit from a compact and efficient configuration, including efficient light sources and illuminators providing illumination of a display panel, high-throughput ocular lenses and other optical elements in the image forming train.

BRIEF DESCRIPTION OF THE DRAWINGS

Exemplary embodiments will now be described in conjunction with the drawings, in which:

FIG. 7A is an exploded cross-sectional view of a display device of this disclosure;

FIG. 7B is a Talbot pattern of light propagating through the display device of FIG. 7B;

DETAILED DESCRIPTION

Figure 1A:
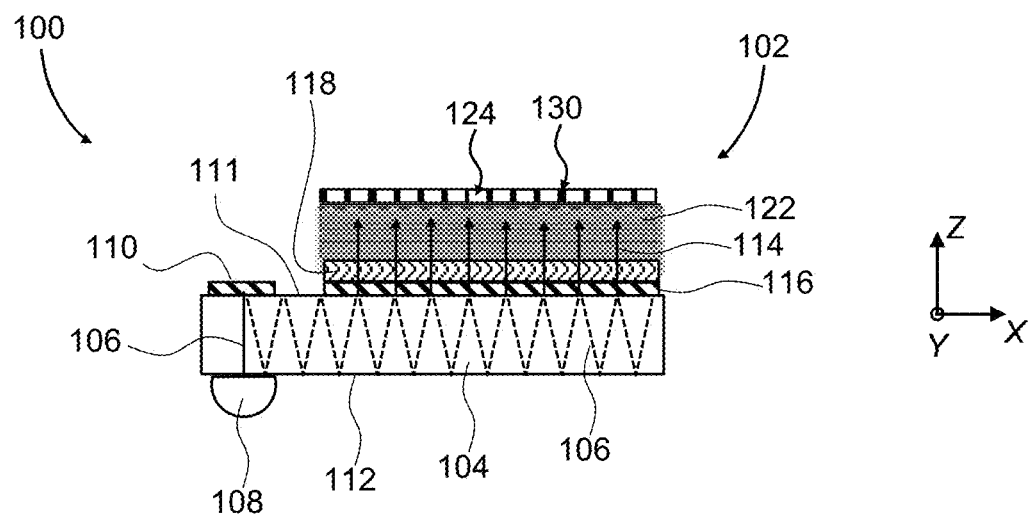
FIG. 1A is a side cross-sectional view of an illuminator of this disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1A-1B, 7A-7B, and FIGS. 8 and 9, similar number refer to similar elements.

In a visual display including an array of pixels coupled to an illuminator, the efficiency of light utilization depends on a ratio of a geometrical area occupied by pixels to a total area of the display panel. For miniature displays often used in near-eye and/or head-mounted displays, the ratio can be lower than 50%. The efficient backlight utilization can be further hindered by color filters on the display panel, which on average transmit no more than 30% of incoming light. On top of that, there may exist a 50% polarization loss for polarization-based display panels such as liquid crystal (LC) display panels. All these factors considerably reduce the light utilization and overall wall plug efficiency of the display, which is undesirable.

In accordance with this disclosure, light utilization and wall plug efficiency of a backlit display may be improved by providing an illuminator a slab lightguide and a light-patterning structure, e.g. a phase mask, disposed downstream of the slab lightguide to concentrate the out-coupled wide light beam into an array of tightly focused light spots. In displays where the illuminator emits light of primary colors, e.g. red, green, and blue, the colors and locations of focused spots of illuminating light may be matched to that of the color filters of the display. Furthermore, upon such illumination with color-interleaved arrays of focused spots, the color filters may be omitted altogether. For polarization-based displays, the polarization of the emitted light may be matched to a pre-defined input polarization state. Matching the spatial distribution, transmission wavelength, and/or the transmitted polarization characteristics of the pixels of the display panel enables one to considerably improve the useful portion of display light that is not absorbed or reflected by the display panel on its way to the eyes of the viewer, and consequently to considerably improve the display's wall plug efficiency.

The phase mask, or another type of arrayed focusing element, may be configured to form an array of optical power density peaks from the array of light spots at a distance from the array of light spots due to Talbot effect. This enables the illuminating light to traverse a substrate of the display panel being illuminated while preserving the optical power density distribution in form of an array of peaks, which can be matched to individual pixels of the display panel. The phase mask and/or the illuminating multi-color light source may be configured to provide color-interleaved offset color channel sub-arrays matched to the color sub-pixel geometry of the display panel—an approach which may lead to very dense pixel pitches of a display panel, up to 2000 pixels per inch and higher.

In accordance with the present disclosure, there is provided an illuminator for a display panel. The illuminator comprises a slab of transparent material. The slab has first and second outer surfaces for propagating illuminating light in the slab by a series of internal reflections from the first and second outer surfaces. The illuminator further includes an out-coupling grating supported by the slab for out-coupling portions of the illuminating light from the slab at the first surface, and a focusing element for forming an array of light spots from the out-coupled illuminating light portions downstream of the focusing element for illuminating pixels of the display panel. The focusing element may be configured to form an array of optical power density peaks from the array of light spots at a distance from the array of light spots due to Talbot effect.

The focusing element may include a microlens array, e.g. an array of refractive microlenses, an array of diffractive microlenses, an array of liquid crystal microlenses, an array of Pancharatnam-Berry phase (PBP) microlenses, etc. More generally, the focusing element may include a phase mask, such as a liquid crystal (LC) layer with a spatially variable LC orientation, a patterned LC polymer, a nanostructure having a spatially varying height, etc.

In some embodiments, the illuminator includes multi-color light source for providing the illuminating light to the slab, the illuminating light comprising light of a plurality of color channels. Such illuminator may be configured to couple the light of different ones of the plurality of color channels at different angles into the slab. Light spots of the array of light spots form color-interleaved sub-arrays of light spots corresponding to the plurality of color channels. The focusing element may be configured to form color-interleaved sub-arrays of light spots, the color-interleaved sub-arrays corresponding to the light of the plurality of color channels. In some embodiments, the illuminator may include a light source for providing the illuminating light to the slab, and a tiltable reflector in an optical path between the light source and the slab, for varying an in-coupling angle of the illuminating light into the slab.

In accordance with the present disclosure, there is provided a display device comprising a display panel comprising a pixel array on a substrate, and an illuminator of this disclosure coupled to the display panel for illuminating the pixel array through the substrate. The illuminator may include: a slab of transparent material, the slab comprising first and second outer surfaces for propagating illuminating light in the slab by a series of internal reflections from the first and second surfaces; an out-coupling grating supported by the slab for out-coupling portions of the illuminating light from the slab at the first surface; and a light-patterning structure. The light-patterning structure comprises at least one of an amplitude mask or a phase mask for forming an array of light spots from the out-coupled illuminating light portions. In operation, light of the formed light spots propagates through the substrate and produces an array of optical power density peaks at the pixel array due to Talbot effect. The light patterning structure may include an array of refractive and/or diffractive microlenses, an array of Pancharatnam-Berry phase (PBP) microlenses, a patterned liquid crystal polymer, a nanostructure having a spatially varying height, etc.

In some embodiments, the display includes a beam steering layer in an optical path downstream of the slab, for angularly steering the out-coupled illuminating light portions. The display device may include a multi-color light source for providing the illuminating light to the slab, the illuminating light comprising light of a plurality of color channels. The illuminator may be configured to couple the light of different ones of the plurality of color channels at different angles into the slab, such that light spots of the array of light spots form color-interleaved sub-arrays of the array of light spots, the color-interleaved sub-arrays corresponding to the light of the plurality of color channels. The light-patterning structure may be configured to form the color-interleaved sub-arrays of the array of light spots. The out-coupled illuminating light portions of the plurality of color channels formed into the color-interleaved sub-arrays of light spots may propagate in the substrate of the display panel and produce color-interleaved sub-arrays of the array of optical power density peaks at the pixel array. The color-interleaved sub-arrays of optical power density peaks at the pixel array may be different Talbot orders of the color-interleaved sub-arrays of the array of light spots. The color-interleaved sub-arrays of optical power density peaks may have a high spatial density of peaks, e.g. the color-interleaved sub-arrays of optical power density peaks may each have a density of at least 2000 peaks per inch.

The display device may include a tiltable reflector in an optical path between the multi-color light source and the slab for varying an in-coupling angle of the illuminating light into the slab. In such embodiments, the display device may further include a controller operably coupled to the multi-color light source and the tiltable reflector and configured to: tilt the tiltable reflector to a first tilt angle corresponding to a first color channel of the plurality of color channels; cause the multi-color light source to produce light of the first color channel; tilt the tiltable reflector to a first tilt angle corresponding to a second, different color channel of the plurality of color channels; and cause the multi-color light source to produce light of the second color channel. The first and second tilt angles may be selected to provide a same output angle of the illuminating light portions.

In accordance with the present disclosure, there is further provided a method for illuminating a display panel comprising a pixel array on a substrate. The method comprises propagating illuminating light in a slab of transparent material by a series of internal reflections from slab surfaces; out-coupling portions of the illuminating light from the slab at one of the slab surfaces using an out-coupling grating; spatially modulating the illuminating light portions in at least one of amplitude or phase to form an array of light spots from the out-coupled illuminating light portions; and propagating light of the formed light spots through the substrate to form an array of optical power density peaks at the pixel array due to Talbot effect.

In embodiments where the illuminating light comprises light of a plurality of color channels, the illuminating light portions may be spatially modulated to form color-interleaved sub-arrays of the array of light spots, the color-interleaved sub-arrays corresponding to the light of the plurality of color channels, whereby the array of optical power density peaks comprises color-interleaved sub-arrays of optical power density peaks at the pixel array. In some embodiments, the method may include angularly steering the out-coupled illuminating light portions using at least one of a tiltable reflector or a steering layer in an optical path between a source of the illuminating light and the pixel array. In embodiments where the display panel comprises a black grid, the out-coupled illuminating light portions may be steered in a spatially selective manner to provide a spatially-selective dimming of the display panel by redirecting the illuminating light portions to impinge onto the black grid instead of the pixel array.

Referring now to FIG. 1A, an illuminator 100 for illuminating a display panel 102 includes a slab 104 of transparent material, e.g. a plano-parallel slab of glass, plastic, transparent oxide, transparent crystalline material, or another suitable material. The slab 104 includes first 111 and second 112 opposed outer surfaces for propagating illuminating light 106 in the slab 104 by a series of internal reflections from the first 111 and second 112 outer surfaces, as illustrated schematically with a zigzag dashed line. The illuminating light 106 may be emitted by a light source 108 and coupled into the slab 104 by an in-coupling grating 110 or by another suitable in-coupling structure such as a prism, etc. Portions 114 of the illuminating light 106 propagating in the slab 104 are out-coupled through the first surface 111 by an out-coupling grating 116 supported by the slab 104. The out-coupled grating 116 may be a smooth and flat, continuous grating, and may be disposed in the slab 104 or on the slab 104, as shown in FIG. 1A. Thus, the slab 104 with its out-coupling grating 116 operates as a pupil-replicating lightguide providing multiple offset light portions 114.

Figure 1B:
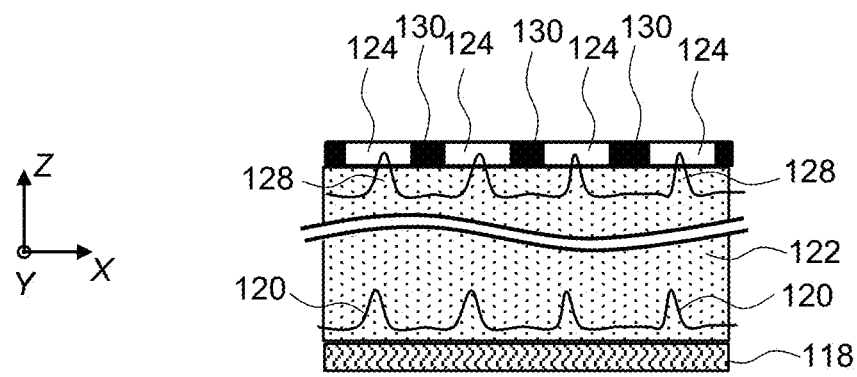
FIG. 1B is a side cross-sectional view of a pixel array of a display panel illuminated by the illuminator of FIG. 1A, superimposed with lateral optical power density distribution of the illuminating light.

The out-coupled light portions 114 form a nearly-collimated light beam that impinges onto a focusing element 118, whose function is to form an array of light spots 120 shown in FIG. 1B. The array of light spots 120 is formed by focusing the out-coupled illuminating light portions 114 downstream of the focusing element 118. In embodiments where a substrate 122 of the display panel 102 is thin enough, the light spots 120 may illuminate pixels 124 of the display panel 102 directly. In embodiments where the substrate 122 is too thick for the light spots 120 to be smaller than lateral size of the pixels 124, the focusing element 118 may be configured to form an array of optical power density peaks 128 from the array of light spots 120 at a z-distance from the array of light spots 120 due to Talbot effect, which enables repetition of a peaky optical power density distribution at a distance from the array of light spots 120 for sufficiently spatially coherent light. Specifically, in FIG. 1B, the array of optical power density peaks 128 illuminates the pixels 124. Positions of individual optical power density peaks 128 are coordinated with positions of individual pixels 124 of the display panel 102, e.g. with one optical power density peak 128 illuminating one pixel 124. In FIGS. 1A and 1B, the display panel 102 is shown in a partial view. The display panel 102 may include other layers and substrates, which have been omitted in FIGS. 1A and 1B for brevity.

Figure 2:
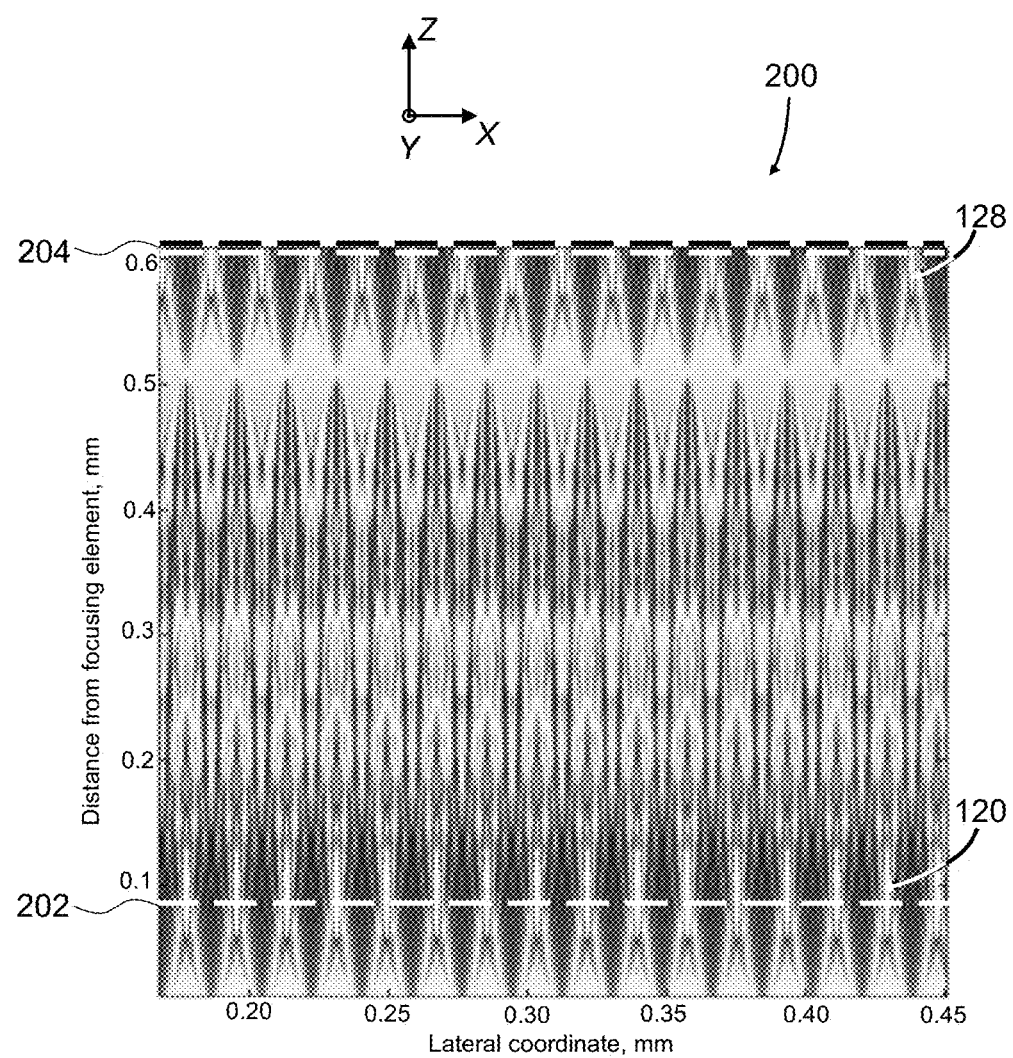
FIG. 2 is a Talbot distribution of optical power density in a substrate of the display panel illuminated by the illuminator of FIG. 1A, in accordance with an embodiment.

The Talbot effect that reproduces the optical power density distribution at a higher plane spaced apart from an original plane of a peaky optical power density distribution is illustrated in FIG. 2. This figure shows a map 200 of optical power density through the substrate 122 of the display panel 102, with horizontal axis (i.e. X-axis in FIG. 2) representing a lateral coordinate on the focusing element 118, and a vertical axis (i.e. Z-axis in FIG. 2) representing the thickness dimension of the substrate 122 of the display panel 102. The focusing element 118 is configured to form the array of light spots 120 at a small distance from the focusing element 118, at a focal plane 202 disposed some 0.09 mm into the substrate 122. The lateral (XY) optical power density distribution is repeated at a Talbot plane 204, forming the array of optical power density peaks 128 at the Talbot plane 204 with a same pitch as at the focal plane 202. The array of pixels 124 of the display panel 102 is disposed at the Talbot plane 204. Such a configuration allows the efficiency of light utilization to be considerably increased due to most of the illuminating light 106 propagating through the pixels 124 without being absorbed by a black grid 130 between the pixels 124 (FIGS. 1A and 1B).

Figure 3A:
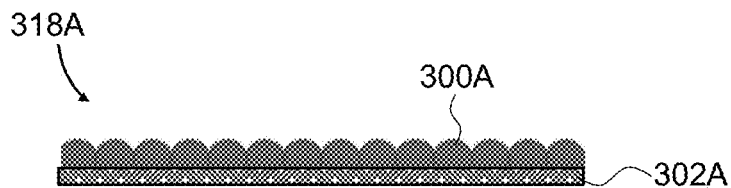
FIG. 3A is a side cross-sectional view of a refractive microlens array usable as a focusing element in the illuminator of FIG. 1A.

Non-limiting examples of the focusing element 118 will now be considered with reference to FIGS. 3A to 3F. Referring first to FIG. 3A, a refractive microlens array 318A may be used as the focusing element 118 of the illuminator 100 of FIGS. 1A and 1B. The refractive microlens array 318A of FIG. 3A includes many refractive microlenses 300A disposed on a transparent substrate 302A. The refractive microlens array 318A may be made of e.g. a transparent isotropic material, e.g. injection molded from a suitable optical quality plastic. The refractive microlenses 300A focus impinging light due to surface curvature, like regular refractive singlet lenses. The refractive microlenses 300A may be disposed in a two-dimensional (2D) array with geometrical configuration and pitch corresponding to the geometrical configuration and pitch of the pixels 124 of the display panel 102.

Figure 3B:
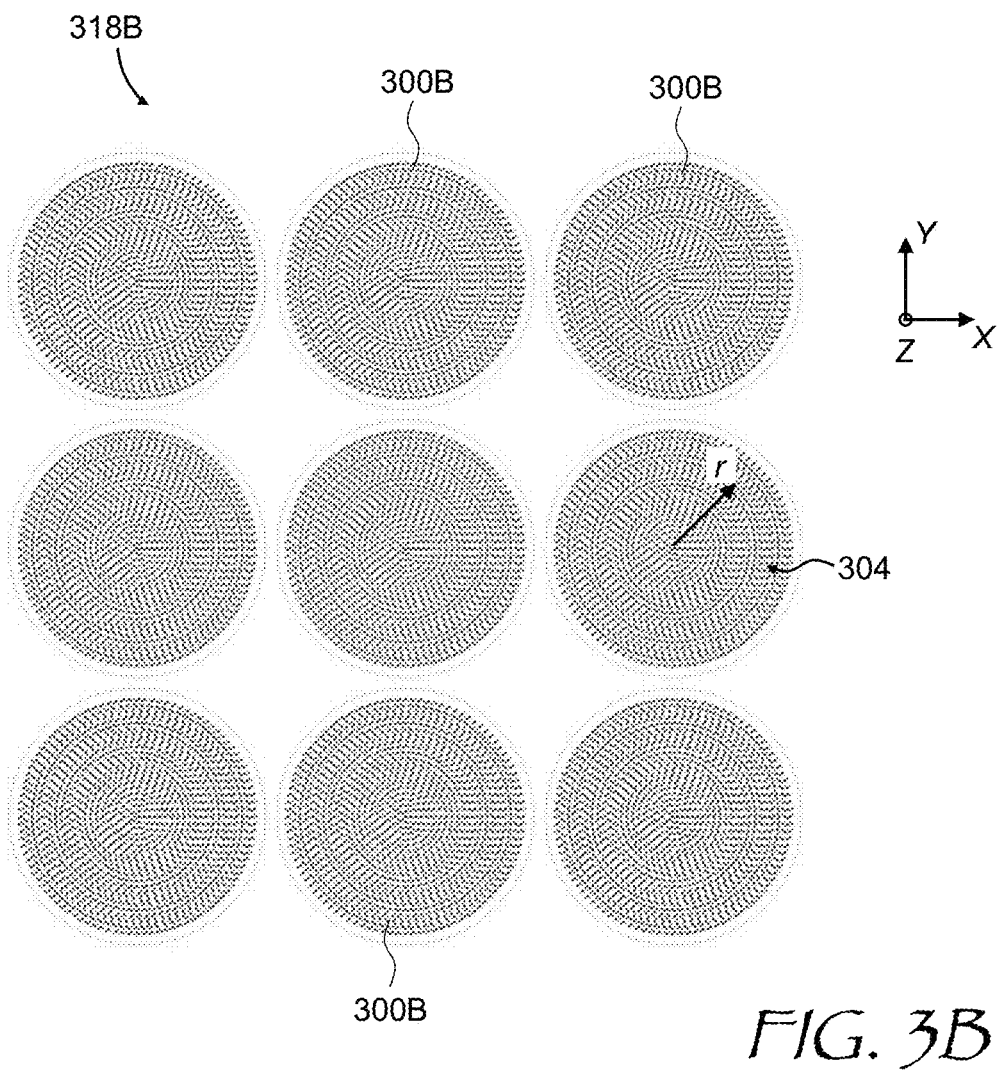
FIG. 3B is a plan view of a Pancharatnam-Berry phase (PBP) microlens array usable as a focusing element in the illuminator of FIG. 1A.

Referring to FIG. 3B, a Pancharatnam-Berry phase (PBP) array 318B may be used as the focusing element 118 of the illuminator 100 of FIGS. 1A and 1B. The PBP microlens array 318B of FIG. 3B includes an array of PBP LC microlenses 300B formed in a liquid crystal (LC) layer. LC molecules 304 are disposed in XY plane at a varying in-plane orientation depending on the distance r from the lens center. The orientation angle φ(r) of the LC molecules 304 in the liquid crystal layer of each PBP LC microlens 300B is given by $$\phi(r) = \frac{\pi r^2}{2 f_0 \lambda_0} \quad (1a)$$

where $f_0$ is a desired focal length and $\lambda_0$ is wavelength. The optical phase delay in each PBP LC microlens 300B is due to Pancharatnam-Berry phase, or geometrical phase effect. An optical retardation R of the liquid crystal layer having a thickness t is defined as R=tΔn, where Δn is the optical birefringence of the liquid crystal layer. At the optical retardation R of the LC layer of $\lambda_0/2$, i.e. half wavelength, the accumulated phase delay P(r) due to the PBP effect can be expressed rather simply as P(r)=2φ(r), or, by taking into account Eq. (1a) above, $$P(r) = \frac{\pi r^2}{f_0 \lambda_0} \quad (1b)$$

It is the quadratic dependence of the PBP P(r) on the radial coordinate r that results in the focusing, or defocusing, function of each PBP LC microlens 300B. Each PBP LC microlens 300B has the azimuthal angle φ continuously and smoothly varying across the surface of the LC layer. Accordingly, the mapping of the azimuthal angle to PBP, i.e. P(r)=2φ(r) when R=$\lambda_0/2$, allows for a more drastic phase change without introducing discontinuities at a boundary of 2π modulo.

Figure 3C:
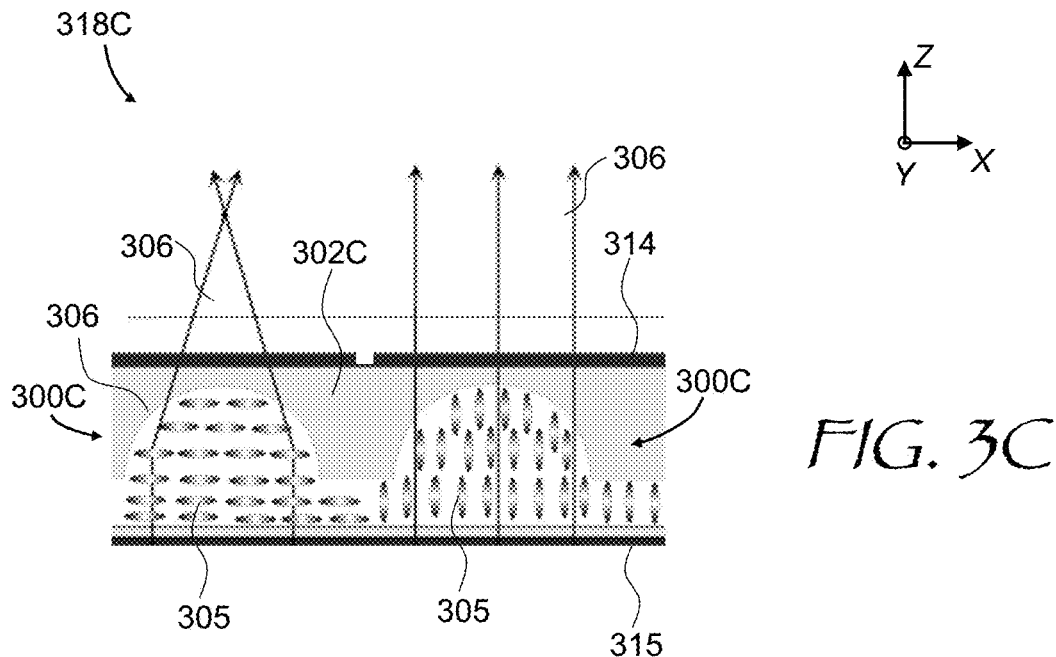
FIG. 3C is a side cross-sectional view of a liquid crystal (LC) microlens array usable as a focusing element in the illuminator of FIG. 1A.

Referring to FIG. 3C, a liquid crystal (LC) microlens array 318C may be used as the focusing element 118 of the illuminator 100 of FIGS. 1A and 1B. The LC microlens array 318C of FIG. 3C may include an array of LC microlenses 300C including round droplets (e.g. hemispherical droplets) of oriented LC molecules 305 immersed into an isotropic polymer substrate 302C. The refractive index of the isotropic polymer substrate may be matched to an ordinary index of refraction of the LC fluid in the droplets. The LC molecules 305 may be oriented e.g. along X-axis as shown on a left-side portion of FIG. 3C. When illuminated with a light beam 306 linearly polarized along x-axis, the microlens 300C will focus the light beam 306 due to the focusing property of a curved interface 306 between the LC droplets and the polymer substrate 302C, the curved interface 306 having a non-zero refractive index step. When the LC molecules 305 become oriented along Z-axis, e.g. by applying an external electric field by means of applying a voltage to a pair of optional transparent electrodes 314 and 315, the curved interface 306 has a zero refractive index step since the refractive index of the isotropic polymer substrate is matched to an ordinary index of refraction of the LC fluid.

Accordingly, the light beam 306 will remain non-focused as illustrated on the right-side portion of FIG. 3C. It is noted that the switching property of the LC microlens array 318C is optional, and LC molecules 305 may have a fixed orientation defined, for example, by a polymer network embedded into the LC droplets and defining a permanent orientation of the LC droplets.

Figure 3D:
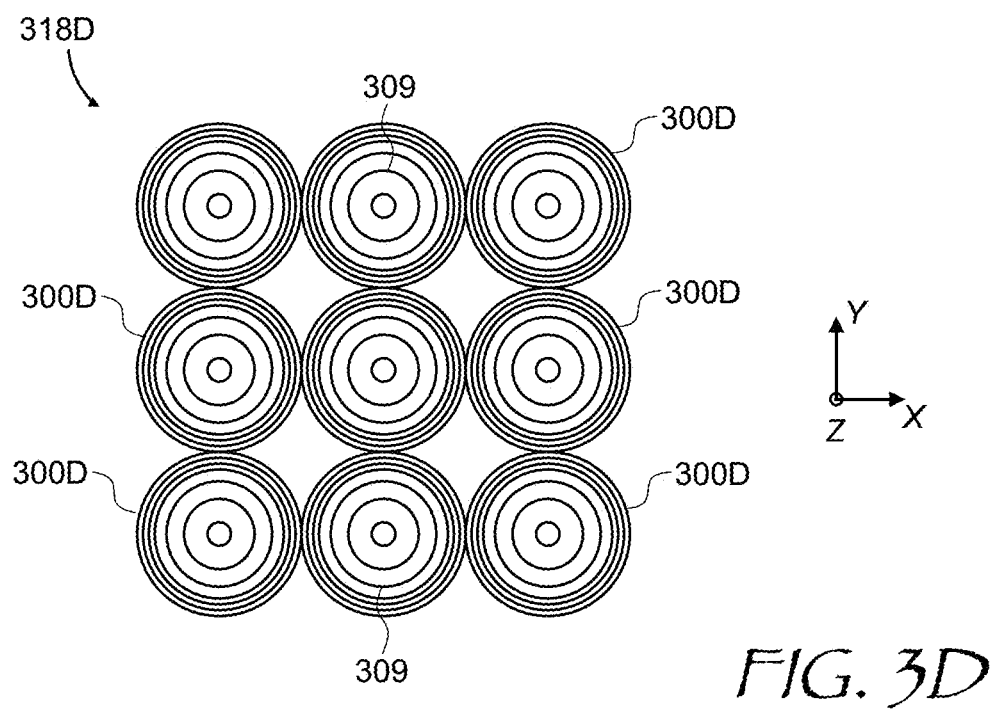
FIG. 3D is a plan view of a diffractive microlens array usable as a focusing element in the illuminator of FIG. 1A.

Referring to FIG. 3D, a diffractive microlens array 318D may be used as the focusing element 118 of the illuminator 100 of FIGS. 1A and 1B. Each diffractive microlens 300D of the diffractive microlens array 318D may include a plurality of concentric fringes or grooves 309 configured to diffract impinging light rays inwards to bring the rays to a focal point at a focal plane.

Figure 3E:
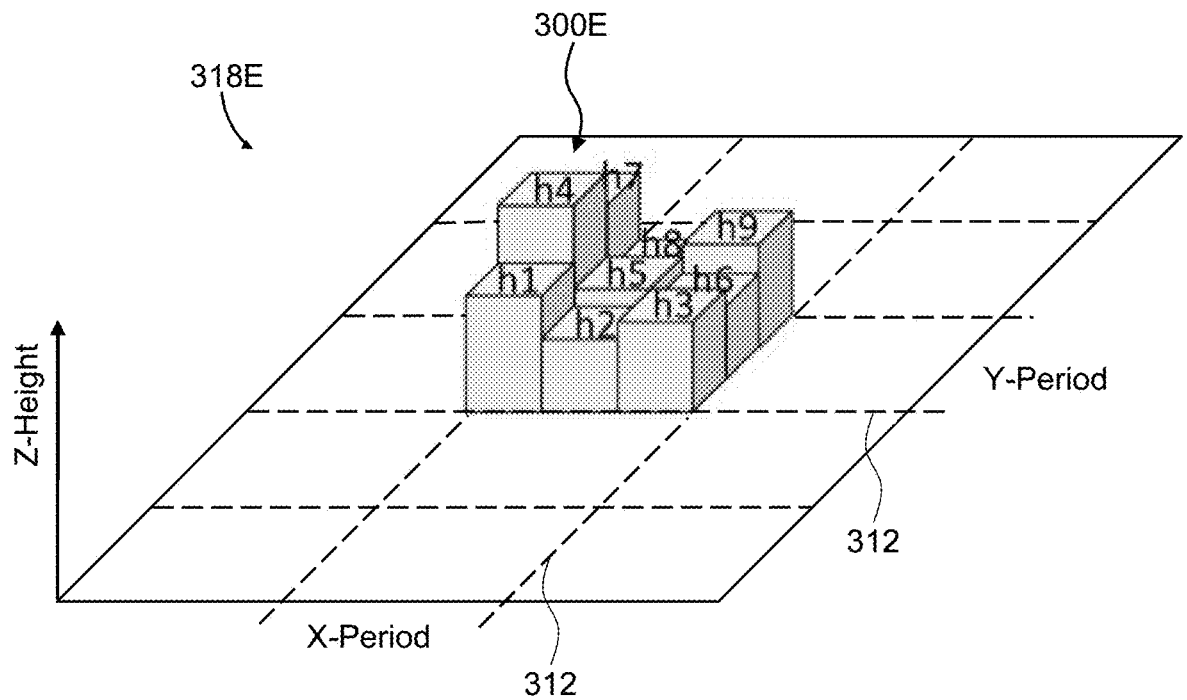
FIG. 3E is a three-dimensional view of a single element of a height-modulated nanostructure usable as a focusing element in the illuminator of FIG. 1A.

Turning to FIG. 3E, a nanostructure 318E may be used as the focusing element 118 of the illuminator 100 of FIGS. 1A and 1B. The nanostructure 318E of FIG. 1E includes an array of identical elements 300E, which may be composed of an array of binary parallelepiped features of differing height. Only one such element 300E is shown in FIG. 3E for brevity; other elements 300E are presumed to be disposed in the rectangles formed by dashed lines 312. Each element 300E has a pre-defined spatially varying height distribution represented by nine elementary heights h1, h2, h3, h4, h5, h6, h7, h8, and h9 in this example. The X-period and Y-period (FIG. 3E) may be e.g. from 1 micrometer to 25 micrometers for example, and may be determined by a pitch of the display panel 102 being illuminated by the illuminator 100 (FIG. 1A). For example, the X-period and Y-period may be equal to X- and Y-pixel pitch respectively of the display panel 102. The operation of the nanostructure 318E will be considered detail further below.

Figure 3F:
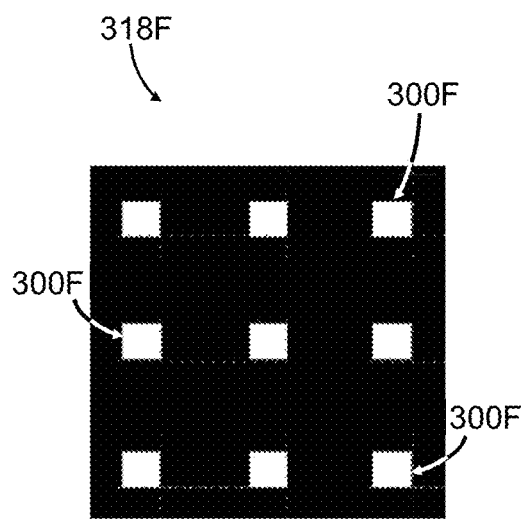
FIG. 3F is a plan view of an amplitude mask usable as a light-patterning structure in the illuminator of FIG. 1A.

Referring now to FIG. 3F, an amplitude mask 318F is an example of an a light-patterning structure that may be used in place of the focusing element 118 of the illuminator 100. The amplitude mask 318F includes an array of openings 300F that transmit impinging light. All the remaining light is blocked. The array of openings 300F creates an initial optical power density distribution to be repeated in the substrate 122 of the display panel via Talbot effect, as illustrated above with reference to FIG. 2. The amplitude mask 318F would have to be disposed at the focal plane 202 instead of the bottom of FIG. 2, to form the array of light spots 120 by amplitude masking the impinging wide light beam. More generally, a light-patterning structure that may be used in place of the focusing element 118 may include any combination of the elements considered above with reference to FIGS. 3A to 3F, and may also include any type of patterned isotropic or anisotropic polymer, e.g. a patterned LC polymer.

For a color display panel, the illuminating light may include a multi-color light source that provides multi-color illuminating light to a pupil-replicating lightguide. The multi-color illuminating light may include light of a plurality of color channels, for example red, green, and blue channels. It would be beneficial to provide focused illuminating light to each color sub-pixel, a color channel of the focused illuminating light matching the color of the sub-pixel. In this manner, light losses due to absorption of light of a "wrong" color channel by a sub-pixel may be minimized, and display efficiency may be increased.

Figure 4:
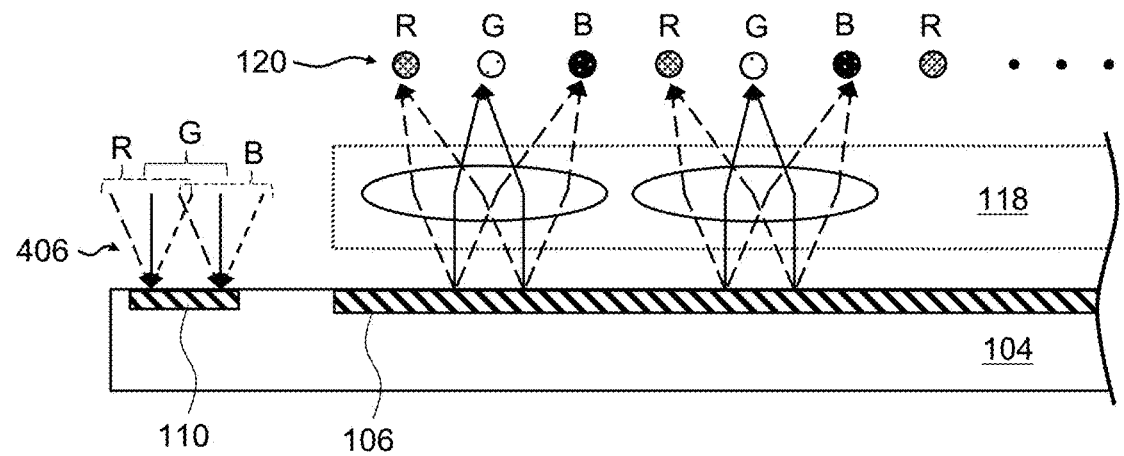
FIG. 4 is a side cross-sectional view of a lightguide illuminated with light of three color channels at different angle of incidence, illustrating a color-dependent lateral shift of light spots focused by the focusing element of the illuminator of FIG. 1A.

One way to provide an array of color-dispersed light spots to a display panel is to pre-tilt light beams of individual color channels impinging onto the pupil-replicating lightguide. Referring to FIG. 4, the slab 104 is illuminated with a multi-color light beam 406 including light of red (R), green (G), and blue (B) color channels in-coupled by the in-coupling grating 110 into the slab 104 at slightly different in-coupling angles. The in-coupling angles are exaggerated in FIG. 4 for clarity. A light beam of the R color channel is shown with long-dash lines, a light beam of the G color channel is shown with solid lines, and a light beam of B color channel is shown with short-dash lines. The light beams of the R, G, B in-coupled color channels propagate in the slab 104 and are out-coupled by the out-coupling grating 116 at angles corresponding to the in-coupling angles of the R, G, B light beams into the slab 104. Since the light beams of the R, G, B in-coupled color channels are out-coupled at different angles, the out-coupled light beams of the R, G, B color channels are focused by the focusing element 118 at offset locations forming color-interleaved sub-arrays of R, G, B light spots, each one of the color-interleaved sub-arrays of R, G, B light spots corresponding to light of a particular one of the plurality of R, G, B color channels.

Figure 5A:
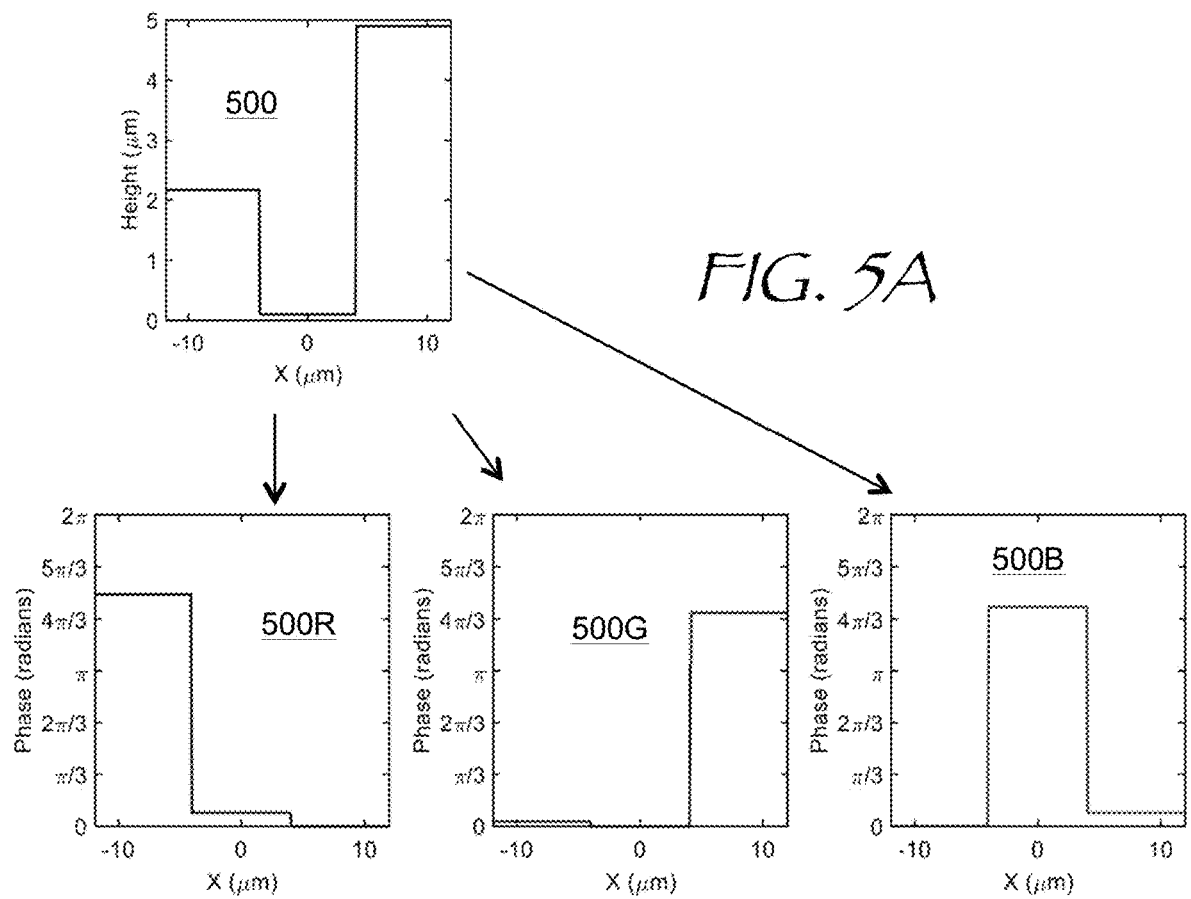
FIG. 5A is a lateral profile of a height-modulated nanostructure that provides different lateral offsets of focused light of different color channels.

Another way to provide an array of color-dispersed light spots to a display panel is to configure the focusing element 118 to focus light of different color channels at laterally offset locations. Referring for a non-limiting illustrative example to FIGS. 5A, 5B, and 5C, and with further reference to FIG. 3E, an embodiment of the nanostructure 318E includes a lateral distribution 500 of height, i.e. a local thickness variation along X-axis as illustrated. The thickness variation is repeated for every pixel of the nanostructure 318E, only one period of such variation being shown in FIG. 5A. Since wavelengths of R, G, and B color channels are different, the lateral distribution 500 will translate into different lateral distributions of optical retardation in waves of corresponding colors. In FIG. 5A, such lateral distributions of optical retardation are shown in units of phase. A R color channel optical retardation distribution 500R is different from a G color channel optical retardation distribution 500G and is different from a B color channel optical retardation distribution 500B.

Figure 5B:
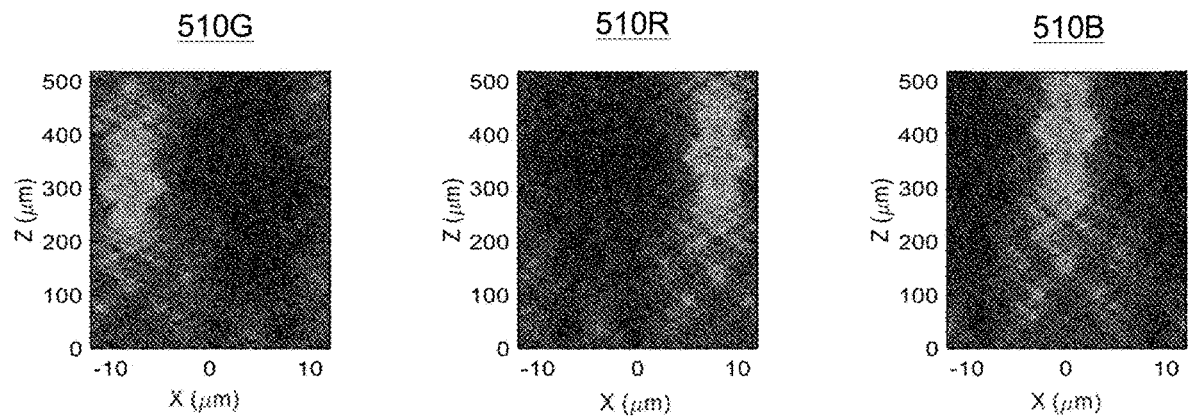
FIG. 5B is a simulated optical power density map showing how light of different color channels can be focused by the height-modulated nanostructure of FIG. 5A at different locations on a focal plane.
Figure 5C:
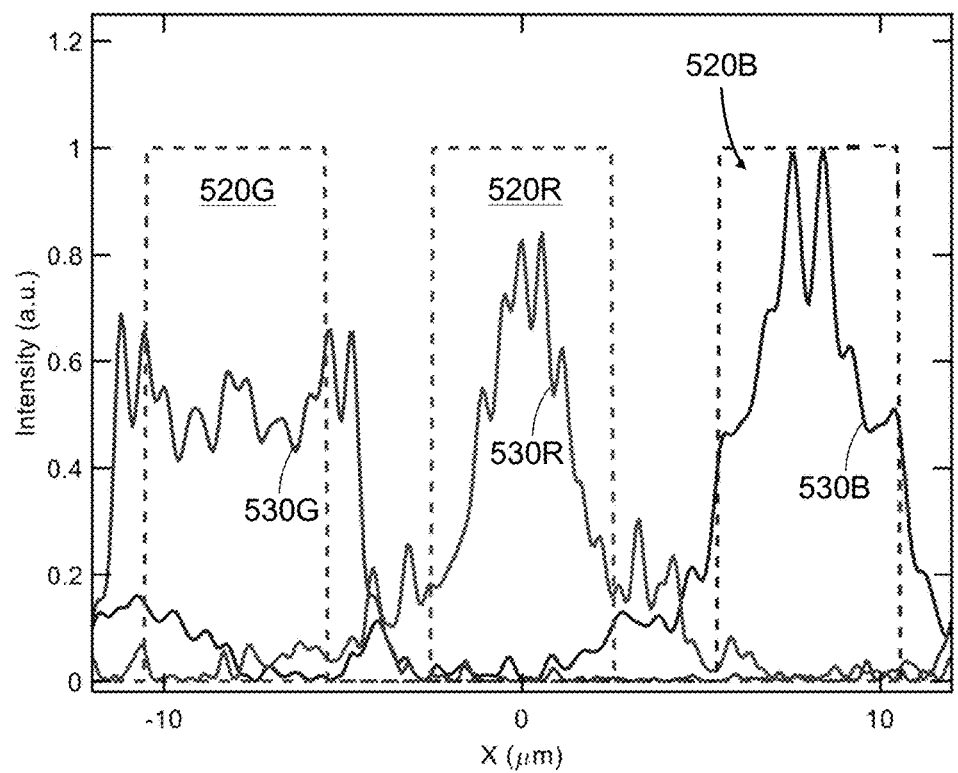
FIG. 5C is a graph of lateral distribution of optical power density of light of different color channels focused at different locations in the focal plane.

FIG. 5B shows simulation results of focusing of the light of G, R, and B color channels by the nanostructure 318E with the lateral distribution 500 of height. In FIG. 5B, the simulation results are shown as spatial intensity maps (heat maps) 510G for G color channel, 510R for R color channel, and 510B for B color channel. One can see that the three focal spots are clearly separated from one another along X-axis. The nanostructure 318E may be configured to match the focused color spots positions with positions of the G, R, and B color sub-pixels of a display panel. This is illustrated in FIG. 5C, which is a graph of lateral optical power density or intensity distribution for light of different color channels. The locations of green 520G, red 520R, and blue 520B sub-pixels are denoted with dashed rectangles. Lateral distributions of optical power density of the light of G (530G), R (530R), and B (530B) color channels are matched to the green 520G, red 520R, and blue 520B sub-pixel positions.

Figure 6A:
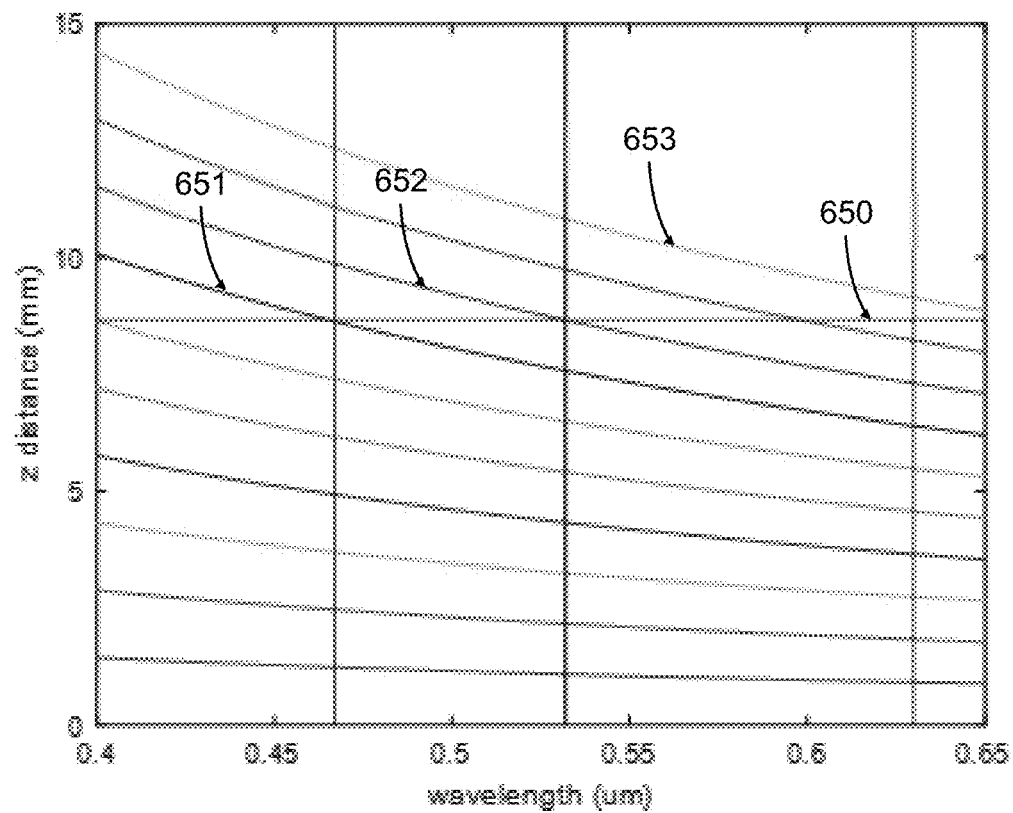
FIG. 6A is a diagram of Talbot plane locations vs. wavelength of light for different Talbot orders, illustrating the principle of using different Talbot orders to have Talbot planes of light at different wavelengths, i.e. light of different color channels, located at a same distance from the focusing element or the light-patterning structure.

A z-position $Z_T$ of a Talbot order N can be determined from the following equation:

$$Z_T = \frac{Na^2}{\lambda}, \quad (2)$$

where a is the length of a Talbot period and $\lambda$ is wavelength of light. FIG. 6A illustrates the wavelength dependence of z-positions (along the substrate thickness dimension) of different Talbot orders. One can see that the z-positions $Z_T$ of different color channels are different for a same order. To make sure that the color-interleaved sub-arrays of optical power density peaks are at the same Z-distance in the plane of the pixel array, different Talbot orders of different color channels may be used. For example, a straight line 650 denotes the z-distance of 9 millimeters. At this distance, an order 651 may be used for blue light at the wavelength of 0.47 micrometer, an order 652 may be used for green light at the wavelength of 0.53 micrometer, and an order 653 may be used for red light at the wavelength of 0.65 micrometer. A partial or fractional Talbot order may be used for the red light at the wavelength of 0.63 micrometer. The color-interleaved sub-arrays of the array of light spots of all color channels will be at the same distance of 9 mm from the array of light spots formed by the illuminator's focusing element.

Figure 6B:
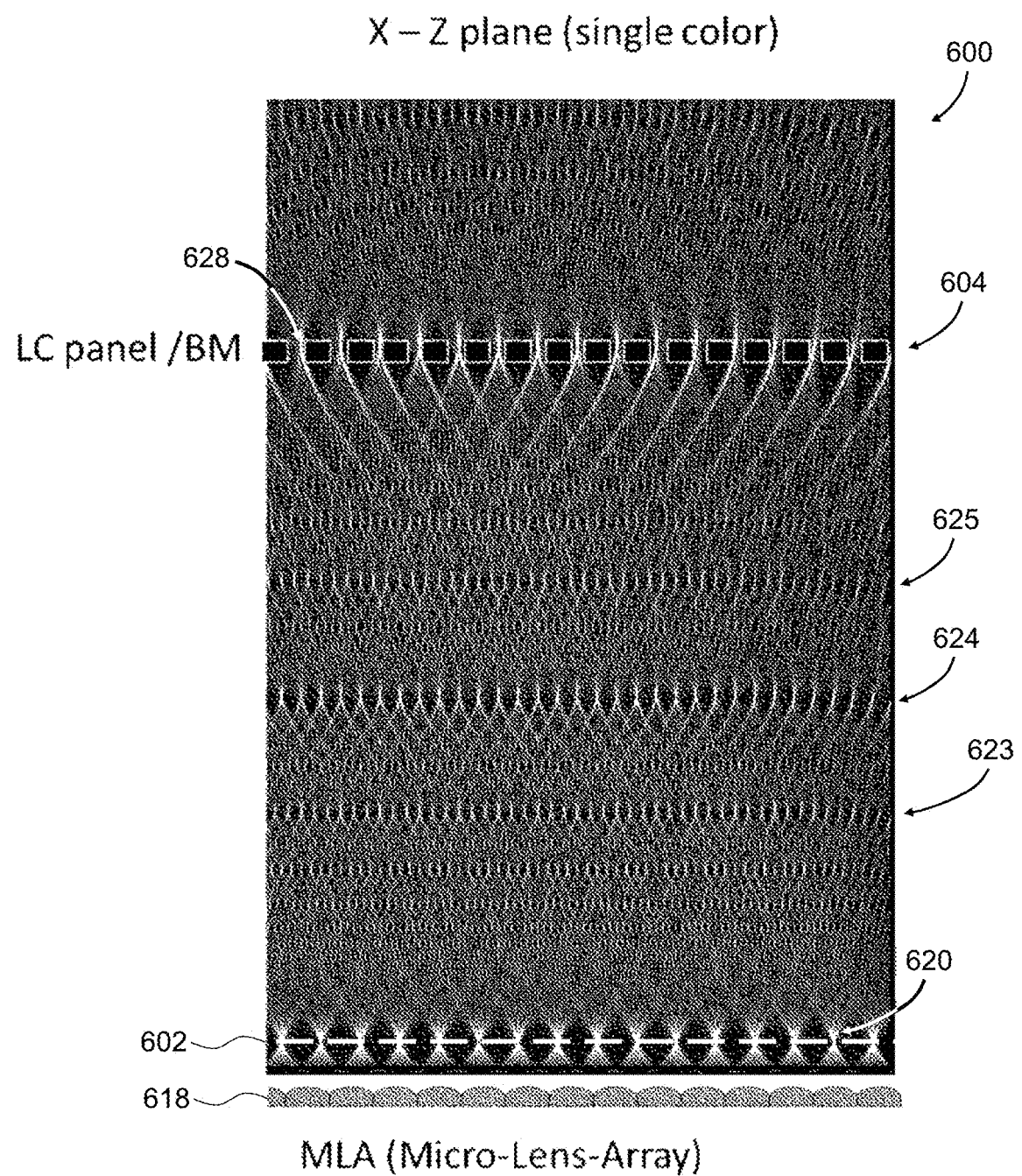
FIG. 6B is a simulated optical power density map illustrating the formation of Talbot planes.

The formation of fractional Talbot orders and planes is illustrated in FIG. 6B for illuminating light of a single color channel. FIG. 6B is an optical power density distribution 600 shown in a XZ plane view. A microlens array 618 focuses illuminating light portions out-coupled from a pupil-replicating lightguide at a focal plane 602 inside a substrate of a display panel being illuminated, forming an array of light spots 620. Intermediate or fractional-order Talbot planes form e.g. at 623, 624, 625 as illustrated. The distribution of optical power density at the focal plane 602 is repeated at a first-order Talbot plane 604, which coincides with a pixel plane of the display panel. An array of optical power density peaks 628 is formed at openings in black matrix (BM) of the display panel, as illustrated. This enables a more efficient light utilization, since less light is being blocked by the black matrix.

Referring now to FIGS. 7A and 7B, a display device 750 includes a display panel 702 (FIG. 7A) optically coupled to the illuminator 100 of FIGS. 1A and 1B and separated from the illuminator 100 by a spacer or air gap 752. The display panel 702 of FIG. 7A is a transmissive LC panel including in sequence an optional polarization element 754, a thin film transistor (TFT) substrate 722 with optional cleanup color filters 755, a twisted nematic (TN) LC fluid layer 756 including LC molecules 757, a backplane substrate 758 supporting a black matrix (BM) layer 760, an analyzing polarizer 762, and virtual reality (VR) optics/ocular lens 764. Other configurations of the transmissive LC panel are of course possible; the configuration of the display panel 702 is only meant as an illustrative non-limiting example.

The operation of the illuminator 100 of the display device 950 has been explained above with reference to FIGS. 1A and 1B. Briefly, the light source 108 emits the light beam 106, which is coupled into the slab 104, propagating in zigzag pattern by a series of reflections e.g. total internal reflections (TIRs) from the top and bottom surfaces of the slab 106. Portions of the light beam 106 are out-coupled by the out-coupling grating 116. A microlens array 618, corresponding to the focusing element 118 of the illuminator 100 of FIGS. 1A and 1B, focuses the light beam portions as explained above with reference to FIG. 6B, forming the Talbot optical power density distribution 600 throughout the display panel 702. For clarity of the picture, the optical power density distribution 600 is shown offset to the right as schematically indicated with arrows 770. The spacer or air gap 752 is selected or tuned during manufacturing and calibration to make sure that the first-order Talbot plane 604 coincides with the BM layer 760, to maximize the optical throughput of the display panel 702.

The light source 108 may be a multi-color light source for providing the illuminating light to the slab, the illuminating light comprising light of a plurality of color channels. As was explained above with reference to FIG. 4, the illuminator 100 may be configured to couple the light of different ones of the plurality of color channels at different angles into the slab 104, such that light spots of the array of light spots form color-interleaved sub-arrays corresponding to the light of the plurality of color channels of the multi-color light source. Alternatively or in addition, the focusing element 118 may be configured to form the color-interleaved sub-arrays of the array of light spots. This optional feature of the illuminator 100 was described above with reference to FIGS. 5A, 5B, and 5C. The out-coupled illuminating light portions of the plurality of color channels formed into the color-interleaved sub-arrays of light spots propagate through the spacer or air gap 752, the polarization element 754, and the TFT substrate 722 of the display panel 702 and produce color-interleaved sub-arrays of the array of optical power density peaks at a pixelated plane of the display panel 702, for example at the BM layer 760. The color-interleaved sub-arrays of optical power density peaks at the pixel array/BM layer 760 may be different Talbot orders of the color-interleaved sub-arrays. This has been explained above with reference to FIG. 6A.

The configuration of the illuminator 100 and the configuration of the display device 750 shown in FIGS. 1A, 1B, and FIGS. 7A, 7B enable very dense pitches of color-interleaved sub-arrays of illuminating light, the smallest pitch being limited by the accuracy of collimated color channel beam pointing. In some embodiments, a density of at least 2000 optical power density peaks per inch may be achieved, enabling ultra compact display panel e.g. for near-eye display applications with pixel densities of 2000 pixels per inch or higher.

A tight pitch of optical power density peaks and associated small size of color sub-pixels of the illuminated display panel may require a very fine adjustment of the lateral position of the optical power density peaks relative to the color sub-pixels of the display panel, to maximize the optical throughput of a display panel. The adjustment may be performed in a variety of ways. For example, referring to FIG. 8, an illuminator 800 is similar to the illuminator 100 of FIGS. 1A and 1B, and includes similar elements. The illuminator 800 of FIG. 8 includes a slab 804 of transparent material, an in-coupling grating 810 and an out-coupling grating 816 supported by the slab 804. The in-coupling grating 810 is a polarization volume hologram (PVH) grating that diffracts circularly polarized light of a first handedness while transmitting through a circularly polarized light of a second, opposite handedness.

In operation, a light source 808 emits a light beam 806 that is circularly polarized at the second handedness. The light beam 806 propagates through the PVH in-coupling grating 810 and the slab 804 and impinges onto a microelectromechanical system (MEMS) reflector 840 including a tiltable mirror 842 supported by a MEMS substrate 850. The light beam 806 is reflected by the tiltable mirror 842 and impinges again onto the PVH in-coupling grating 810. Since handedness of a circularly polarized light reverses upon reflection, the reflected light beam 806 is diffracted by the PVH in-coupling grating 810, which in-couples the light beam 806 into the slab 804 to propagate in the slab 804 by a series of internal reflections from opposed outer surfaces of the slab 804, as illustrated with a solid zigzag arrow.

Out-coupled portions 814 of the light beam 806 are focused by a focusing element 818, in this embodiment a microlens array. It is to be noted that the out-coupled portions 814 originate from an out-coupled wide beam that is broken into individual portions or sub-beams by microlenses 819 of the focusing element 818, not necessarily by the X-period of zigzag reflections. The individual portions are focused into light spots 820, similarly to the illuminator 100 of FIGS. 1A and 1B. The array of light spots 820 is converted into an array of optical power density peaks 828 by Talbot effect in an optical stack including a substrate 822 of the display panel being illuminated, as explained above with reference to FIGS. 7A and 7B.

Figure 8:
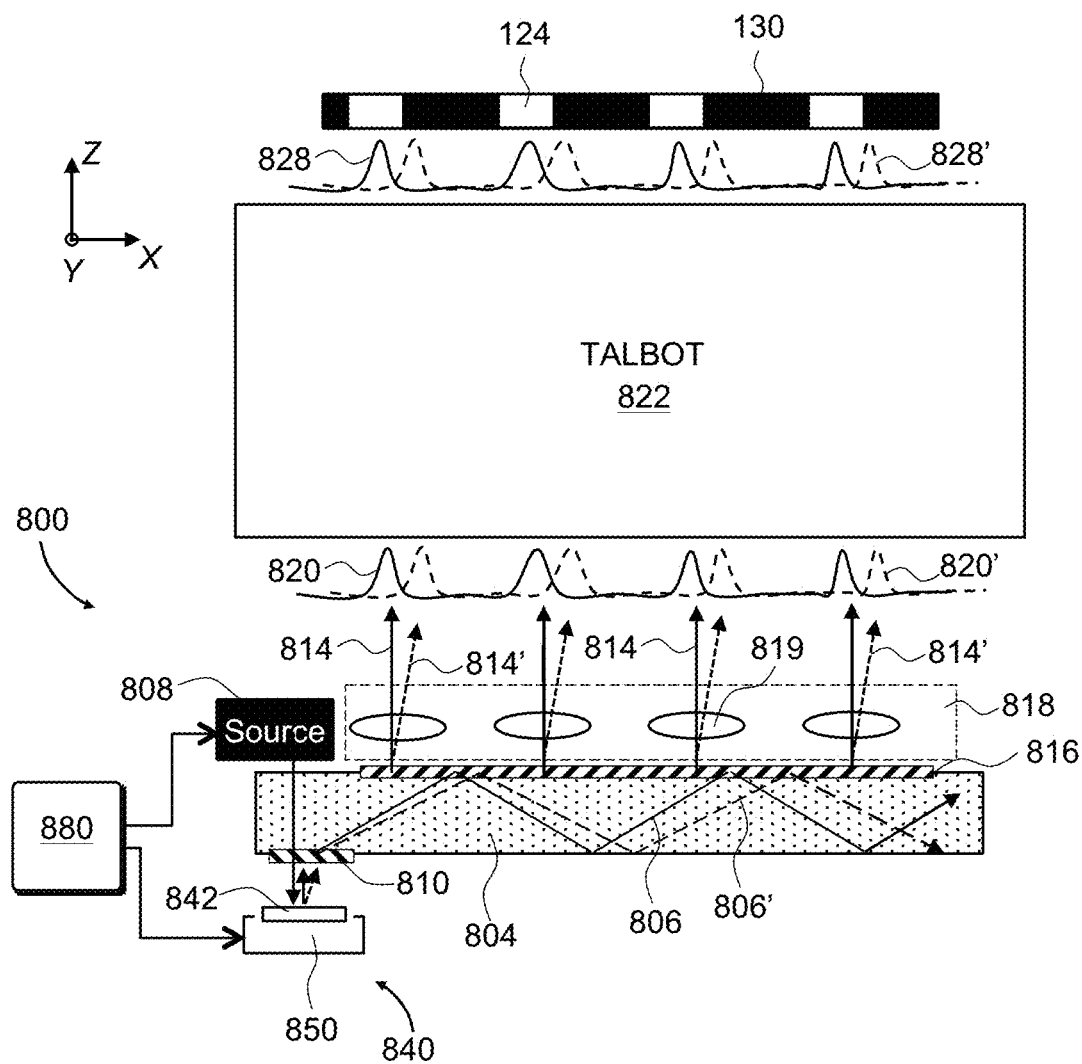
FIG. 8 is a side cross-sectional view of an illuminator embodiment with a tiltable reflector for laterally shifting the positions of the array of light spots/optical power density peaks.

The illuminator 800 of FIG. 8 further includes a controller 880 operably coupled to the light source 808 and the MEMS reflector 840. The controller 880 is configured to tilt the tiltable mirror 842 by a controllable angle to make the array of optical power density peaks 828 coincide with the array of pixels 124 defined by the black grid or black matrix 130. For example, initially the controller 880 may tilt the out-coupled portions 814 to shifted positions 814' shown with dashed lines. At the shifted positions 814', the light spots 820 are shifted from a nominal position. The shifted light spots 820 cause the array of optical power density peaks 828 to also be shifted to positions 828' shown with dashed lines, and no light passes through the black grid 130. The controller 880 may tune the angle of tilt of the tiltable mirror 842 to bring the array of optical power density peaks 828 to the positions overlapping with the pixels 124, and the light passes through the pixels 124. Herein the term "pixels" also includes color sub-pixels of a color display panel.

A tiltable reflector is one example of a steering element of the illuminating light beam. More generally, one or more beam steering layers may be provided in an optical stack of a display device. Referring for a non-limiting example to FIG. 9, a display device 950 is similar to the display device 750 of FIG. 7A, and includes similar elements. The display device 950 of FIG. 9 includes the illuminator 800 of FIG. 8 having the MEMS reflector 840, for adjusting the lateral position (XY plane position) of the arrays of optical power density peaks in the plane of the BM layer 760. For embodiments where the light source 808 is a color light source emitting light beams of a plurality of color channels, the MEMS reflector 840 (or another suitable tiltable reflector) may adjust the lateral position (XY plane position) of the color-interleaved sub-arrays of optical power density peaks in the plane of the BM layer 760.

The display device 950 may further include a beam steering layer in an optical path downstream of the slab 804, for angularly steering the out-coupled illuminating light portions. For example, a reflective beam steering layer 902 may be provided in configurations where the out-coupling grating 816 out-couples portions of illuminating light downwards, not upwards. In such embodiments, the out-coupling grating 816 may be a PVH grating configured to out-couple the portions of the light beam 106 at a circular polarization of e.g. a first handedness while propagation the portions of the light beam of the second handedness reflected by the reflective beam steering layer 902.

Figure 9:
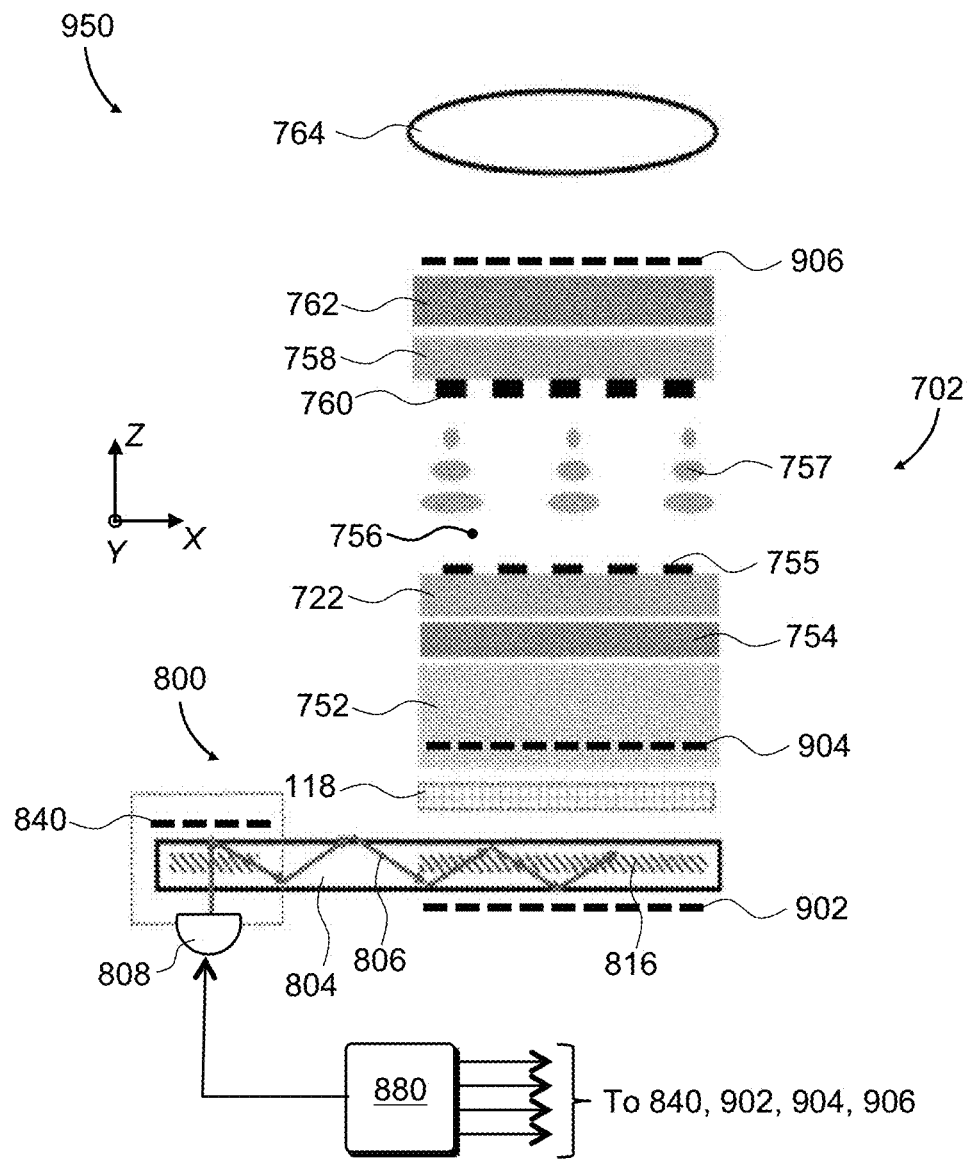
FIG. 9 is an exploded cross-sectional view of a display device with the illuminator of FIG. 8 and additional optional beam steering layers.

In some embodiments, a beam steering layer 904 may be provided downstream of the focusing element 118. In such embodiments, the array of optical power density peaks 828 (FIG. 8) may be steered relative to the array of light spots 820. Alternatively or in addition, a beam steering layer 906 may be provided downstream of the display panel 702, for the purpose of steering the output light beam at the eyebox of the display device 950. The beam steering by the MEMS reflector 840 and the beam steering layer(s) 902, 904, 906, as the case may be, is controlled by the controller 880 (FIG. 9).

In some embodiments, the beam steering by a beam steering layer may be spatially selective. For this, the beam steering layer may be pixelated. Individual areas or pixels of the beam steering layer may be controlled independently. The beam steering layer may include e.g. a switchable diffraction gratings, switchable PBP gratings and/or PBP lenses, etc.

Figures 10A, 10B:
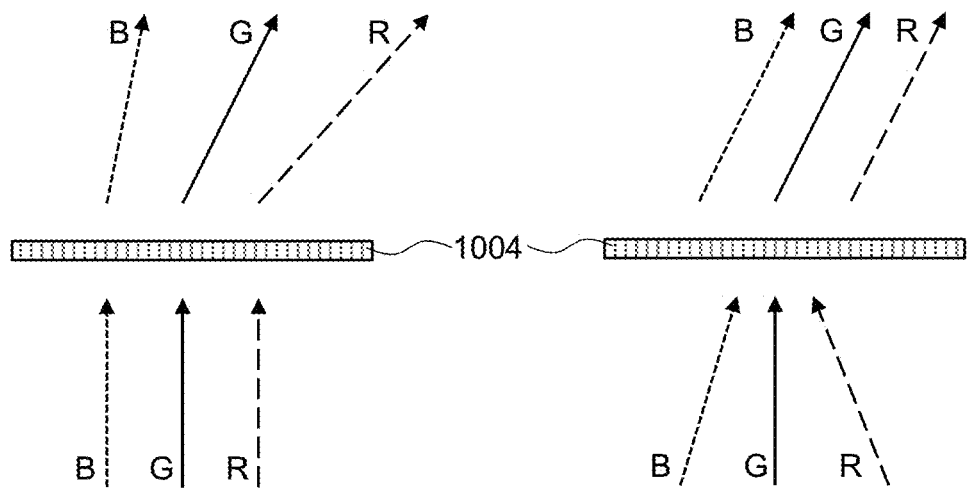
FIGS. 10A and 10B are schematic diagrams illustrating the principle of compensation of angular wavelength dispersion of a switchable grating using the illuminator with tiltable reflector of FIG. 8 or FIG. 9.

When operating with a color light source emitting light of a plurality of color channels, the beam steering layers 902, 904, and 906 based on switchable gratings will exhibit a wavelength dependence of steering angle. This is illustrated in FIG. 10A where the R, G, and B out-coupled light beam portions are diffracted by a switchable grating 1004 at different angles. To compensate for the angular dispersion of the diffraction angle of the switchable grating 1004, the R, G, and B beams may be in-coupled into the slab 804 at different angles, such that the out-coupled light beam portions of the R, G, and B beams are at different angles as illustrated in FIG. 10B. The pre-compensation of the beam angle enables the R, G, and B light beam portions to be steered by a switchable grating 1004 at a same angle. In another embodiment, the R, G, and B beams are in-coupled into the slab 804 in a time-sequential manner, and the MEMS reflector 840 (or another suitable tiltable reflector) is tilted at an angle to provide the out-coupled beam angle pre-compensation illustrated in FIG. 10B.

Figures 11A, 11B, 11C:
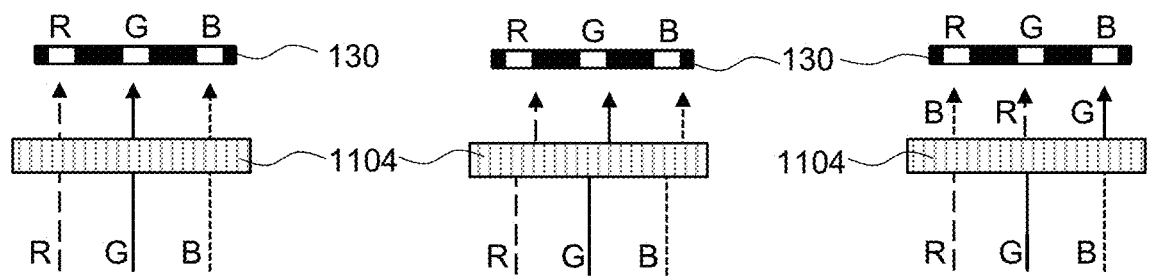
FIGS. 11A, 11B, and 11C are schematic diagrams illustrating a possibility of local dimming by an illuminator of this disclosure.

In embodiments where a steering layer of the illuminator is pixelated, a spatially-selective dimming of the illuminating light is possible. Turning for a non-limiting example to FIGS. 11A, 11B, and 11C, a segment 1104 of the switchable grating 1004 of FIGS. 10A and 10B steers R, G, and B sub-beams that provide respective optical power density peaks at R, G, and B sub-pixels surrounded by the black grid 130. In FIG. 11A, the segment 1104 is tuned to center the optical power density peaks at the R, G, and B pixels. In FIG. 11B, the segment 1104 is tuned to shift the optical power density peaks off center of the R, G, and B sub-pixels to impinge onto the black grid 130, causing local dimming. Furthermore in FIG. 11C, the segment 1104 is tuned to shift the optical power density peaks to a next one of the R, G, and B sub-pixels to cause local dimming by absorption in a color filter element of the respective R, G, and B sub-pixels.

Figure 12:
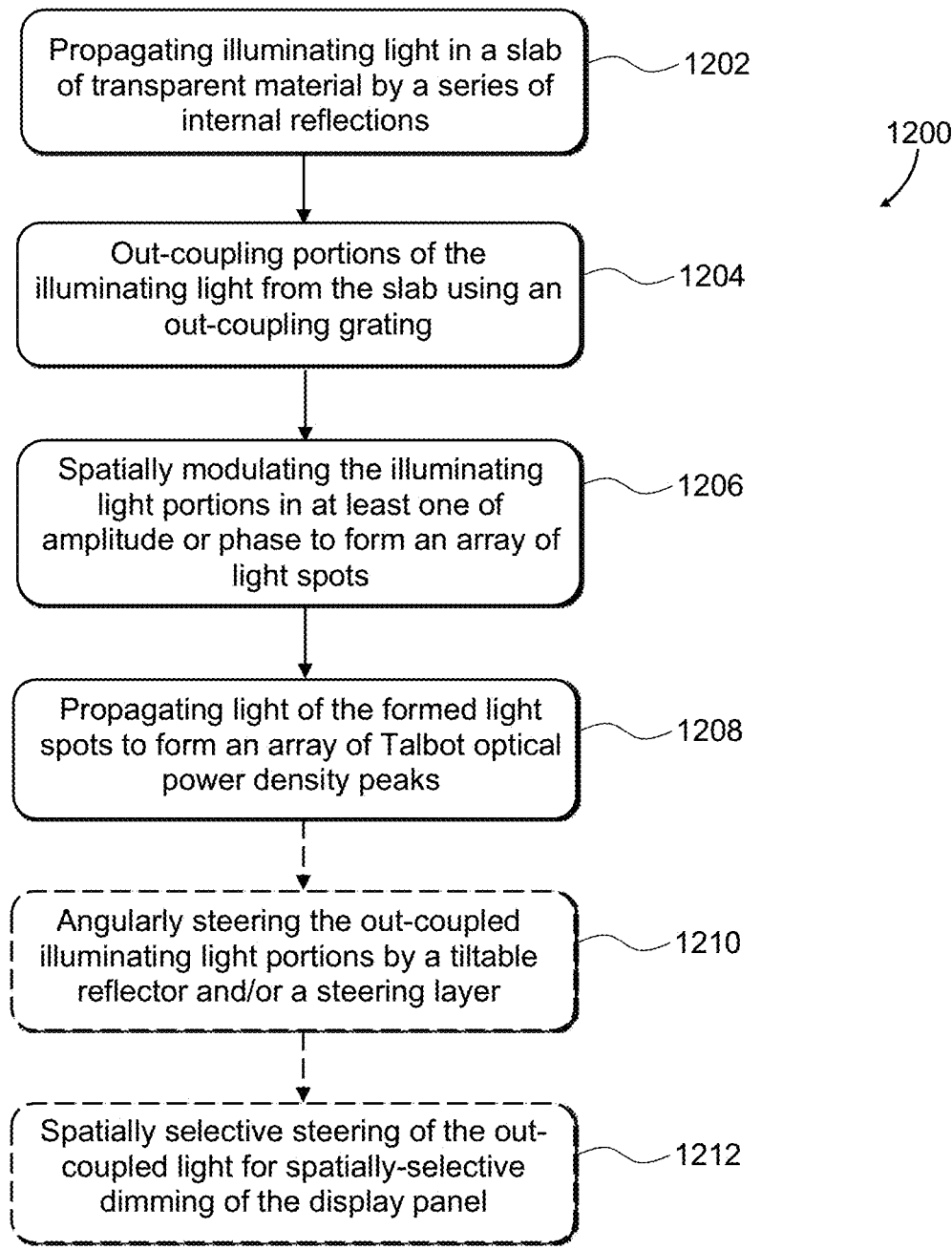
FIG. 12 is a flow chart of a method for illuminating a display panel in accordance with this disclosure.

Referring now to FIG. 12, a method 1200 for illuminating a display panel including a pixel array on a substrate includes propagating (1202) illuminating light in a slab of transparent material. The illuminating light is propagated by a series of internal reflections, such as total internal reflections (TIRs), from opposed outer surfaces of the slab. Portions of the illuminating light are out-coupled (1204) from the slab at one of the slab's outer surfaces using an out-coupling grating. The out-coupling grating may be disposed on or within the slab, and may be a continuous straight diffraction grating such as a surface-relief grating, a PVH grating, etc. The illuminating light portions are spatially modulated (1206) in at least one of amplitude or phase to form an array of light spots from the out-coupled illuminating light portions. The spatially modulating element may include a microlens array, e.g. an array of diffractive, PBP, refractive microlenses, or more generally by a phase and/or amplitude mask as disclosed herein. Light of the formed light spots is propagated (1208) through the substrate to form an array of optical power density peaks at the pixel array due to Talbot effect, as explained above with reference to FIGS. 2, 6B, and 7B.

In embodiments where the illuminating light comprises light of a plurality of color channels, the step 1206 of spatially modulating the illuminating light is performed so as to form color-interleaved sub-arrays (in both X and Y directions) of the array of light spots. The color-interleaved sub-arrays correspond to the light of the plurality of color channels. For example, if the illuminating light includes R, G, and B color channels, the color-interleaved sub-arrays include red, green, and blue interleaved light spots. Light of the arrays of light spots propagates in the substrate of the display panel, forming color-interleaved sub-arrays of optical power density peaks at the pixel array, as explained above with reference to FIGS. 4, 5A-5C, and FIG. 6A. In such embodiments, the out-coupled illuminating light portions may be angularly steered (1210) using at least one of a tiltable reflector or a steering layer disposed in an optical path between a source of the illuminating light and the pixel array, as explained above with reference to FIG. 9.

In embodiments where the display panel comprises a black grid, the out-coupled illuminating light portions are steered (1212) in a spatially selective manner to provide a spatially-selective dimming of the display panel by redirecting the illuminating light portions to impinge onto the black grid instead of the pixel array, as explained above with reference to FIGS. 11A-11C.

Figure 13:
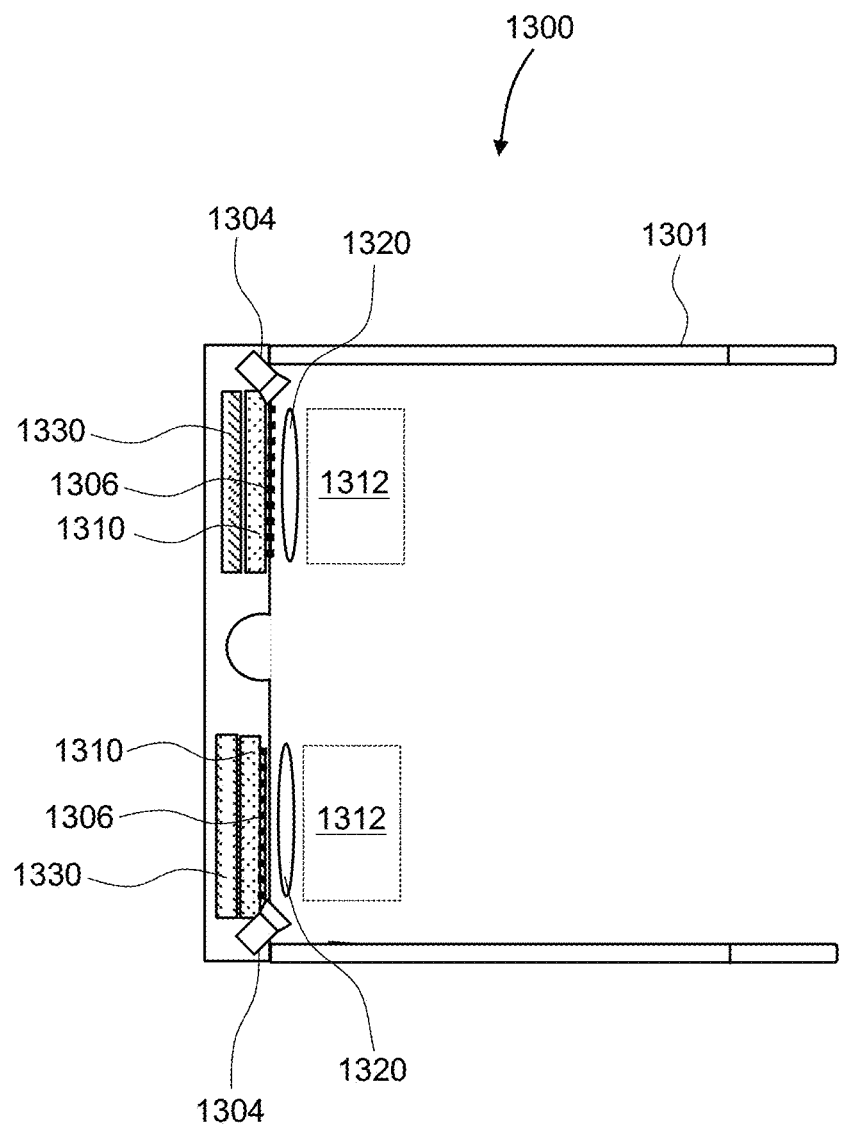
FIG. 13 is a view of an augmented reality (AR) display of this disclosure having a form factor of a pair of eyeglasses.

Referring to FIG. 13, a virtual reality (VR) near-eye display 1300 includes a frame 1301 supporting, for each eye: an illuminator 1330 including any of the waveguide illuminators disclosed herein; a display panel 1310 including an array of display pixels; and an ocular lens 1320 for converting the image in linear domain generated by the display panel 1310 into an image in angular domain for direct observation at an eyebox 1312. A plurality of eyebox illuminators 1306, shown as black dots, may be placed around the display panel 1310 on a surface that faces the eyebox 1312. An eye-tracking camera 1304 may be provided for each eyebox 1312.

The purpose of the eye-tracking cameras 1304 is to determine position and/or orientation of both eyes of the user. The eyebox illuminators 1306 illuminate the eyes at the corresponding eyeboxes 1312, allowing the eye-tracking cameras 1304 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with the light of the eyebox illuminators 1306, the latter may be made to emit light invisible to the user. For example, infrared light may be used to illuminate the eyeboxes 1312.

Figure 14:
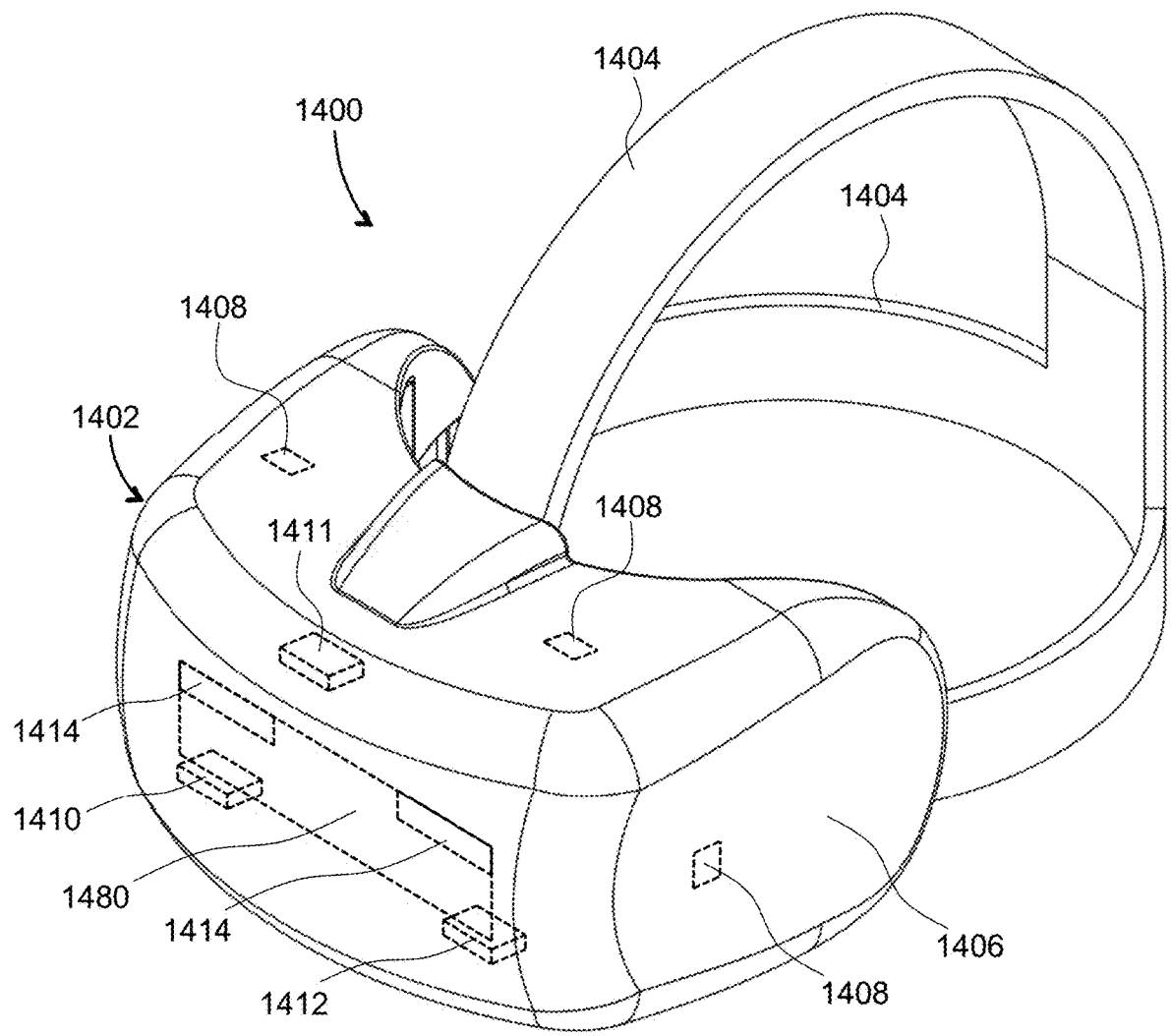
FIG. 14 is a three-dimensional view of a head-mounted display (HMD) of this disclosure.

Turning to FIG. 14, an HMD 1400 is an example of an AR/VR wearable display system which encloses the user's face, for a greater degree of immersion into the AR/VR environment. The HMD 1400 may generate the entirely virtual 3D imagery. The HMD 1400 may include a front body 1402 and a band 1404 that can be secured around the user's head. The front body 1402 is configured for placement in front of eyes of a user in a reliable and comfortable manner. A display system 1480 may be disposed in the front body 1402 for presenting AR/VR imagery to the user. The display system 1480 may include any of the display devices and illuminators disclosed herein. Sides 1406 of the front body 1402 may be opaque or transparent.

In some embodiments, the front body 1402 includes locators 1408 and an inertial measurement unit (IMU) 1410 for tracking acceleration of the HMD 1400, and position sensors 1412 for tracking position of the HMD 1400. The IMU 1410 is an electronic device that generates data indicating a position of the HMD 1400 based on measurement signals received from one or more of position sensors 1412, which generate one or more measurement signals in response to motion of the HMD 1400. Examples of position sensors 1412 include: one or more accelerometers, one or more gyroscopes, one or more magnetometers, another suitable type of sensor that detects motion, a type of sensor used for error correction of the IMU 1410, or some combination thereof. The position sensors 1412 may be located external to the IMU 1410, internal to the IMU 1410, or some combination thereof.

The locators 1408 are traced by an external imaging device of a virtual reality system, such that the virtual reality system can track the location and orientation of the entire HMD 1400. Information generated by the IMU 1410 and the position sensors 1412 may be compared with the position and orientation obtained by tracking the locators 1408, for improved tracking accuracy of position and orientation of the HMD 1400. Accurate position and orientation is important for presenting appropriate virtual scenery to the user as the latter moves and turns in 3D space.

The HMD 1400 may further include a depth camera assembly (DCA) 1411, which captures data describing depth information of a local area surrounding some or all of the HMD 1400. The depth information may be compared with the information from the IMU 1410, for better accuracy of determination of position and orientation of the HMD 1400 in 3D space.

The HMD 1400 may further include an eye tracking system 1414 for determining orientation and position of user's eyes in real time. The obtained position and orientation of the eyes also allows the HMD 1400 to determine the gaze direction of the user and to adjust the image generated by the display system 1480 accordingly. The determined gaze direction and vergence angle may be used to adjust the display system 1480 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1402.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An illuminator for a display panel, the illuminator comprising:
   a slab of transparent material, the slab comprising first and second outer surfaces for propagating illuminating light in the slab by a series of internal reflections from the first and second outer surfaces;
   an out-coupling grating supported by the slab for out-coupling portions of the illuminating light from the slab at the first surface; and
   a focusing element for forming an array of light spots from the out-coupled illuminating light portions downstream of the focusing element for illuminating pixels of the display panel, wherein the focusing element is configured to form an array of optical power density peaks from the array of light spots at a distance from the array of light spots due to a Talbot effect.

2. The illuminator of claim 1, wherein the focusing element comprises a microlens array.

3. The illuminator of claim 2, wherein the microlens array comprises at least one of: an array of refractive microlenses; an array of diffractive microlenses; an array of liquid crystal microlenses; or an array of Pancharatnam-Berry phase (PBP) microlenses.

4. The illuminator of claim 1, wherein the focusing element comprises a phase mask.

5. The illuminator of claim 4, wherein the phase mask comprises at least one of: a liquid crystal (LC) layer with a spatially variable LC orientation; a patterned LC polymer; or a nanostructure having a spatially varying height.

6. The illuminator of claim 1, further comprising a multi-color light source for providing the illuminating light to the slab, the illuminating light comprising light of a plurality of color channels;
   wherein
   the illuminator is configured to couple the light of different ones of the plurality of color channels at different angles into the slab, such that light spots of the array of light spots form color-interleaved sub-arrays of light spots corresponding to the plurality of color channels.

7. The illuminator of claim 1, further comprising:
   a light source for providing the illuminating light to the slab; and
   a tiltable reflector in an optical path between the light source and the slab, for varying an in-coupling angle of the illuminating light into the slab.

8. The illuminator of claim 1, further comprising a multi-color light source for providing the illuminating light to the slab, the illuminating light comprising light of a plurality of color channels, wherein the focusing element is configured to form color-interleaved sub-arrays of light spots, the color-interleaved sub-arrays corresponding to the light of the plurality of color channels.

9. A display device comprising:
a display panel comprising a pixel array on a substrate; and
an illuminator coupled to the display panel for illuminating the pixel array through the substrate, the illuminator comprising:
a slab of transparent material, the slab comprising first and second outer surfaces for propagating illuminating light in the slab by a series of internal reflections from the first and second surfaces;
an out-coupling grating supported by the slab for out-coupling portions of the illuminating light from the slab at the first surface; and
a light-patterning structure comprising at least one of an amplitude mask or a phase mask for forming an array of light spots from the out-coupled illuminating light portions, wherein in operation, light of the formed light spots propagates through the substrate and produces an array of optical power density peaks at the pixel array due to Talbot effect.

10. The display device of claim 9, wherein the light-patterning structure comprises at least one of:
an array of refractive microlenses;
an array of diffractive microlenses;
an array of Pancharatnam-Berry phase (PBP) microlenses;
a patterned liquid crystal polymer; or
a nanostructure having a spatially varying height.

11. The display device of claim 9, further comprising a beam steering layer in an optical path downstream of the slab, for angularly steering the out-coupled illuminating light portions.

12. The display device of claim 9, further comprising a multi-color light source for providing the illuminating light to the slab, the illuminating light comprising light of a plurality of color channels;
wherein at least one of:
the illuminator is configured to couple the light of different ones of the plurality of color channels at different angles into the slab, such that light spots of the array of light spots form color-interleaved sub-arrays of the array of light spots, the color-interleaved sub-arrays corresponding to the light of the plurality of color channels; or
the light-patterning structure is configured to form the color-interleaved sub-arrays of the array of light spots; and
wherein the out-coupled illuminating light portions of the plurality of color channels formed into the color-interleaved sub-arrays of light spots propagate in the substrate of the display panel and produce color-interleaved sub-arrays of the array of optical power density peaks at the pixel array.

13. The display device of claim 12, further comprising a tiltable reflector in an optical path between the multi-color light source and the slab, for varying an in-coupling angle of the illuminating light into the slab.

14. The display device of claim 13, further comprising a controller operably coupled to the multi-color light source and the tiltable reflector and configured to:
tilt the tiltable reflector to a first tilt angle corresponding to a first color channel of the plurality of color channels;
cause the multi-color light source to produce light of the first color channel;
tilt the tiltable reflector to a first tilt angle corresponding to a second, different color channel of the plurality of color channels; and
cause the multi-color light source to produce light of the second color channel;
wherein the first and second tilt angles are selected to provide a same output angle of the illuminating light portions.

15. The display device of claim 12, wherein the color-interleaved sub-arrays of optical power density peaks at the pixel array are different Talbot orders of the color-interleaved sub-arrays of the array of light spots.

16. The display device of claim 12, wherein the color-interleaved sub-arrays of optical power density peaks each have a density of at least 2000 peaks per inch.

17. A method for illuminating a display panel comprising a pixel array on a substrate, the method comprising:
propagating illuminating light in a slab of transparent material by a series of internal reflections from slab surfaces;
out-coupling portions of the illuminating light from the slab at one of the slab surfaces using an out-coupling grating;
spatially modulating the illuminating light portions in at least one of amplitude or phase to form an array of light spots from the out-coupled illuminating light portions; and
propagating light of the formed light spots through the substrate to form an array of optical power density peaks at the pixel array due to Talbot effect.

18. The method of claim 17, wherein:
the illuminating light comprises light of a plurality of color channels; and
the illuminating light portions are spatially modulated to form color-interleaved sub-arrays of the array of light spots, the color-interleaved sub-arrays corresponding to the light of the plurality of color channels, whereby the array of optical power density peaks comprises color-interleaved sub-arrays of optical power density peaks at the pixel array.

19. The method of claim 17, further comprising angularly steering the out-coupled illuminating light portions using at least one of a tiltable reflector or a steering layer in an optical path between a source of the illuminating light and the pixel array.

20. The method of claim 19, wherein the display panel comprises a black grid, and wherein the out-coupled illuminating light portions are steered in a spatially selective manner to provide a spatially-selective dimming of the display panel by redirecting the illuminating light portions to impinge onto the black grid instead of the pixel array.

* * * * *